(12) United States Patent
Shahvirdi Dizaj Yekan et al.

(10) Patent No.: US 12,374,791 B2
(45) Date of Patent: Jul. 29, 2025

(54) STRIPLINE FEED DISTRIBUTION NETWORK WITH EMBEDDED RESISTOR PLANE FOR MILLIMETER WAVE APPLICATIONS

(71) Applicant: BDCM A2 LLC, Dover, DE (US)

(72) Inventors: Taha Shahvirdi Dizaj Yekan, San Diego, CA (US); Souren Shamsinejad, Irvine, CA (US)

(73) Assignee: BDCM A2 LLC, Dover, DE (US)

( * ) Notice: Subject to any disclaimer, the term of this patent is extended or adjusted under 35 U.S.C. 154(b) by 1095 days.

(21) Appl. No.: 17/033,356

(22) Filed: Sep. 25, 2020

(65) Prior Publication Data

US 2021/0091463 A1 Mar. 25, 2021

Related U.S. Application Data

(60) Provisional application No. 62/905,808, filed on Sep. 25, 2019.

(51) Int. Cl.
*H01Q 3/00* (2006.01)
*H01Q 3/36* (2006.01)
(Continued)

(52) U.S. Cl.
CPC ............ *H01Q 3/36* (2013.01); *H01Q 3/00* (2013.01); *G01S 7/032* (2013.01); *H01Q 1/48* (2013.01);
(Continued)

(58) Field of Classification Search
CPC .. H01Q 3/36; H01Q 3/30; H01Q 3/26; H01Q 3/00; H01Q 1/48; H01Q 9/045; G01S 7/052
(Continued)

(56) References Cited

U.S. PATENT DOCUMENTS 6,037,903 A * 3/2000 Lange ............... H01Q 1/38
343/872
6,580,402 B2 * 6/2003 Navarro ............ H01Q 21/0093
333/137
(Continued)

FOREIGN PATENT DOCUMENTS

JP 2006108741 A * 4/2006 ............ H01P 5/19
WO WO-2010111038 A1 * 9/2010 ............ H01Q 9/04
WO WO-2020134455 A1 * 7/2020 ............ H01P 3/081

*Primary Examiner* — Chuong P Nguyen
(74) *Attorney, Agent, or Firm* — Dinsmore & Shohl LLP

(57) ABSTRACT

Examples disclosed herein relate to a stripline feed distribution network with embedded resistor for use in millimeter-wave applications. The feed distribution network includes a plurality of ground planes and a signal plane coupled to the plurality of ground planes. The signal plane is configured to serve as a feed to an antenna array with signaling operating at a millimeter-wave frequency bands. The signal plane includes an input transmission line and a plurality of output transmission lines coupled to the input transmission line. The feed distribution network also includes a resistor plane interposed between the signal plane and at least one ground plane of the plurality of ground planes. The resistor plane is configured to isolate the signal plane from the antenna array, and to match a characteristic impedance between the input transmission line and the plurality of output transmission lines.

19 Claims, 14 Drawing Sheets

(51) Int. Cl.
  *G01S 7/03*      (2006.01)
  *H01Q 1/48*     (2006.01)
  *H01Q 3/26*     (2006.01)
  *H01Q 3/30*     (2006.01)
  *H01Q 9/04*     (2006.01)

(52) U.S. Cl.
  CPC .............. *H01Q 3/26* (2013.01); *H01Q 3/30* (2013.01); *H01Q 9/045* (2013.01)

(58) Field of Classification Search
  USPC .................................................. 342/371, 372
  See application file for complete search history.

(56) References Cited

U.S. PATENT DOCUMENTS

| | | | | |
|---|---|---|---|---|
| 8,217,839 | B1* | 7/2012 | Paulsen | H01Q 21/10 |
| | | | | 343/810 |
| 8,279,131 | B2* | 10/2012 | Puzella | H01Q 21/0087 |
| | | | | 343/700 MS |
| 10,910,702 | B2* | 2/2021 | Edenfield | H01Q 23/00 |
| 11,146,323 | B2* | 10/2021 | Apaydin | H01Q 21/061 |
| 11,199,611 | B2* | 12/2021 | Wöhlte | G01S 13/931 |
| 11,271,323 | B2* | 3/2022 | Takahashi | H01Q 13/106 |
| 11,495,877 | B2* | 11/2022 | Pelletti | H01Q 3/36 |
| 11,606,134 | B2* | 3/2023 | Apaydin | H01Q 1/38 |
| 2005/0151215 | A1* | 7/2005 | Hauhe | H01Q 21/0025 |
| | | | | 343/702 |
| 2008/0316139 | A1* | 12/2008 | Blaser | H01Q 21/0037 |
| | | | | 343/904 |
| 2017/0187101 | A1* | 6/2017 | Freeman | H01Q 21/065 |
| 2019/0140362 | A1* | 5/2019 | Edenfield | H01Q 21/24 |
| 2020/0241109 | A1* | 7/2020 | Shahvirdi Dizaj Yekan | |
| | | | | G01S 13/44 |
| 2022/0070997 | A1* | 3/2022 | Clark | H05K 1/025 |
| 2022/0166122 | A1* | 5/2022 | Varonen | H01L 23/66 |
| 2022/0268886 | A1* | 8/2022 | Shamsinejad | G01S 7/4004 |
| 2023/0014090 | A1* | 1/2023 | Yoon | H01Q 21/0025 |
| 2023/0057121 | A1* | 2/2023 | Prasannakumar | H01Q 1/521 |
| 2023/0178879 | A1* | 6/2023 | Prasannakumar | H01Q 1/521 |
| | | | | 343/848 |
| 2023/0208379 | A1* | 6/2023 | Yun | H04B 1/18 |
| | | | | 343/700 R |

* cited by examiner

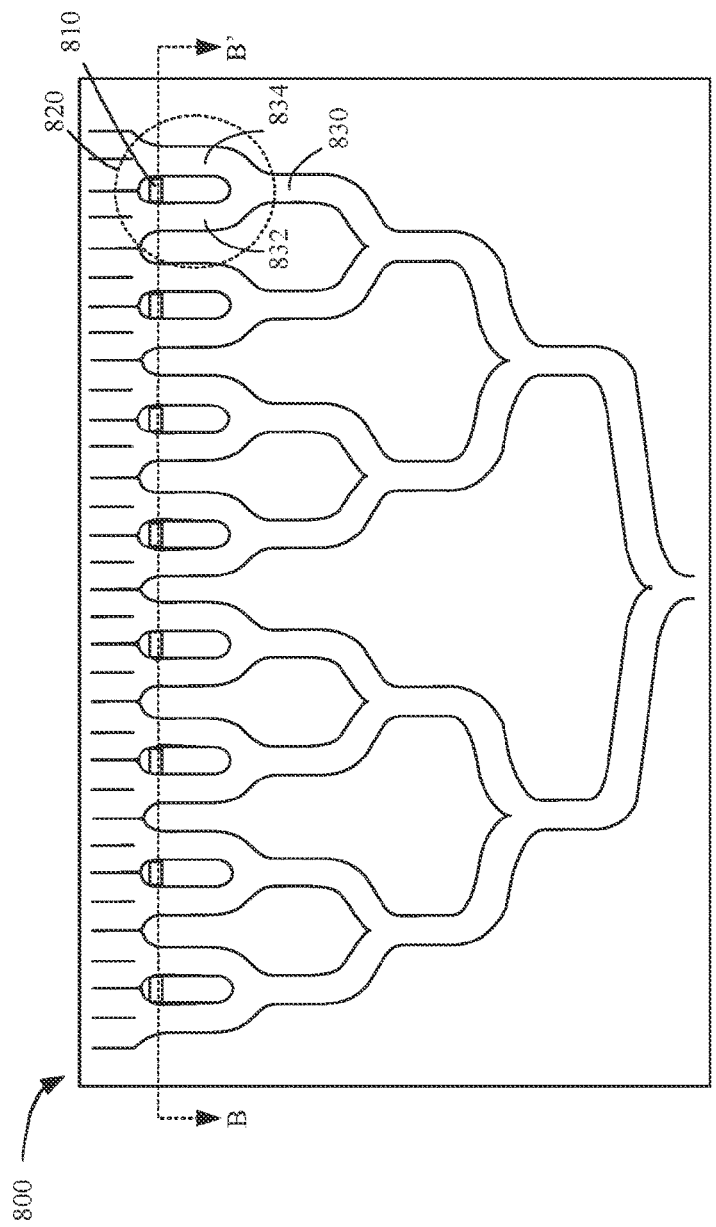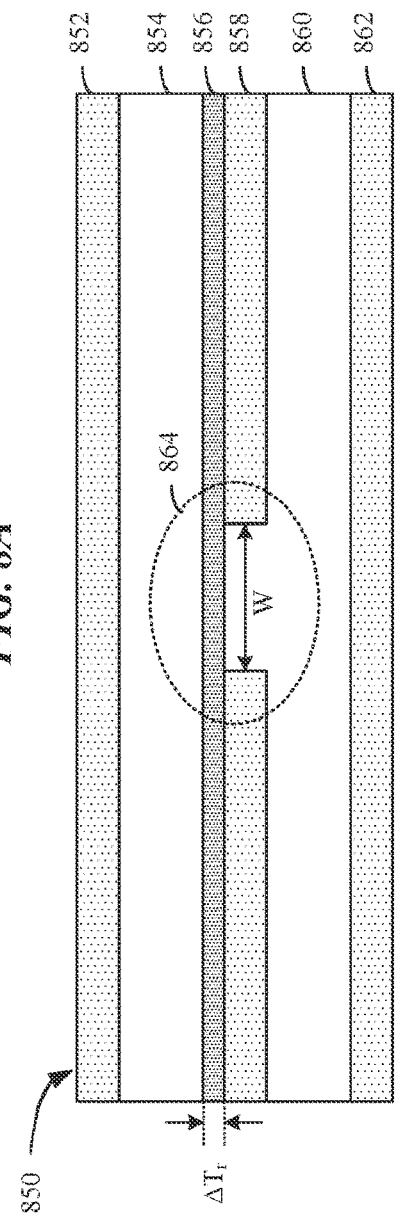
FIG. 8A
FIG. 8B

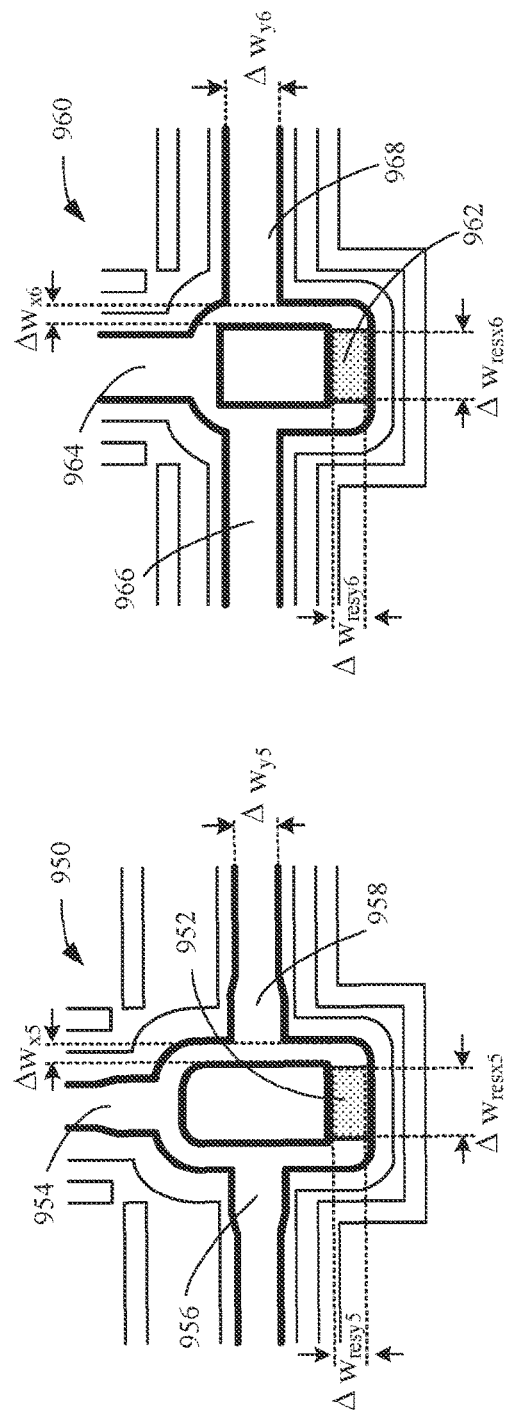
FIG. 9E
FIG. 9F
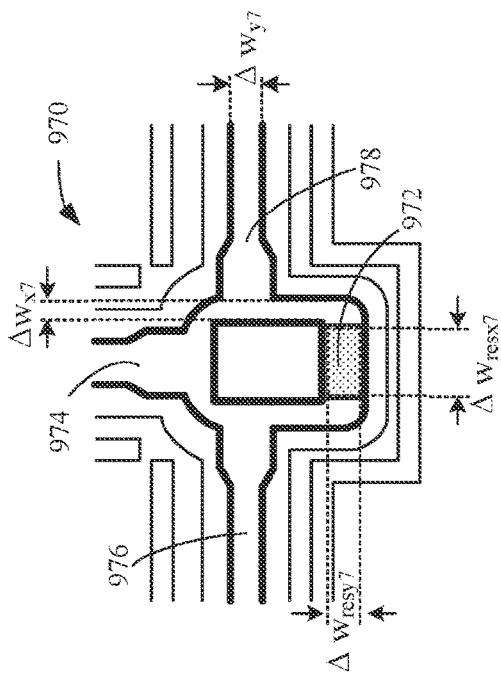
FIG. 9G

STRIPLINE FEED DISTRIBUTION NETWORK WITH EMBEDDED RESISTOR PLANE FOR MILLIMETER WAVE APPLICATIONS

CROSS REFERENCE TO RELATED APPLICATION

This application claims priority to U.S. Provisional Patent Application 62/905,808, filed Sep. 25, 2019, which is incorporated by reference in its entirety.

BACKGROUND

Phased array antennas form a radiation pattern by combining signals from a number of antenna elements and controlling the phase and amplitude of each element. The antenna or radiating elements are arranged in an array or sub-arrays, and typically include patches in a patch antenna configuration, a dipole, or a magnetic loop, among others. The relative phase between each radiating element can be fixed or adjusted by employing phase shifters coupled to each element. The direction of the beam generated by the antenna is controlled by changing the phase of the individual elements.

The phased array antennas include a feed network that serves as a power divider for transmitting a radiating signal, and reciprocally, serves as a power combiner for receiving return signals. The feed network is coupled to the radiating elements and to the phase shifters. The power dividers and combiners may include a particular topology, such as Wilkinson or a T-junction. Achieving high isolation, low insertion loss, and balanced amplitude and phase characteristics of power dividers and combiners that are integrated in complex systems used in millimeter wave applications beyond 70 gigahertz (GHz) is particularly challenging.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein:

FIG. 8A illustrates a schematic diagram of a Wilkinson-type feed distribution layer with an embedded resistor plane, according to various implementations of the subject technology;

FIG. 8B illustrates a cross-sectional view of the feed distribution layer of FIG. 8A at the B-B' axis, according to various implementations of the subject technology;

FIGS. 9A-G illustrate top-view schematic diagrams of different layout configurations of the Wilkinson-type feed distribution layer, according to various implementations of the subject technology;

DETAILED DESCRIPTION

Figure 1:
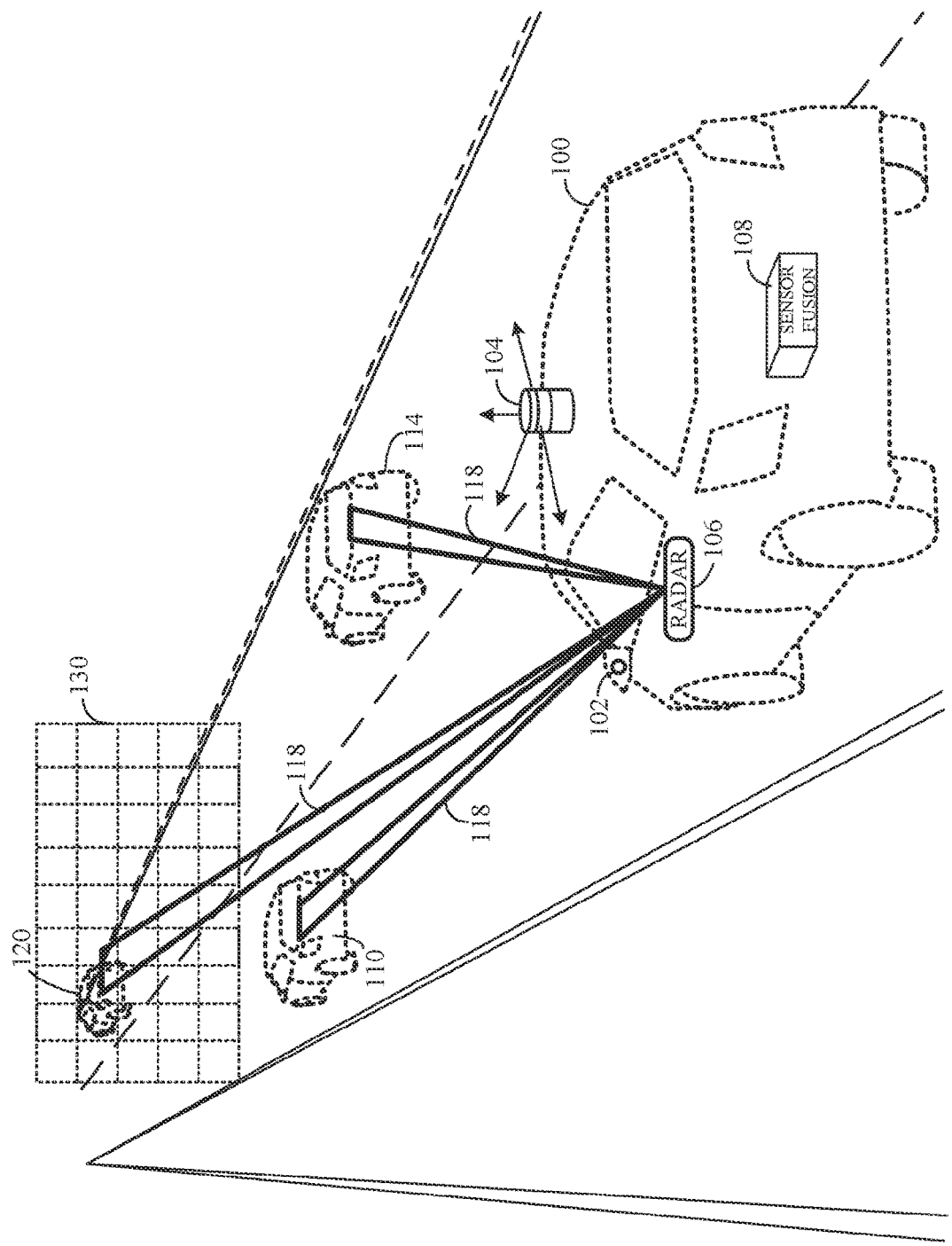
FIG. 1 illustrates an example environment within an autonomous vehicle in which a beam steering radar in an autonomous vehicle is used to detect and identify objects, according to various implementations of the subject technology.

A stripline feed distribution with embedded resistor plane for use in millimeter wave applications is disclosed. The stripline feed distribution includes a stripline power divider that divides an incoming signal into two or more output signals. In some aspects, the stripline feed distribution also includes a stripline power combiner that combines incoming signals propagating through two or more input ports into a single output signal. The subject disclosure provides for a stripline power divider/power combiner having a multilayered structure with an embedded resistor layer, with a wideband response and higher isolation characteristics. The embedded resistor helps minimize reflections and provides improved isolation and matching among the ports, as well as allows for improved shielding between feedline components and the antenna.

In some aspects, transmission signals are provided from a power divider circuit of Substrate Integrated Waveguides (SIWs). The SIW power divider may be a planar waveguide structure having a T-junction topology in some implementations, or a Wilkinson-type topology in other implementations. By adding a resistor between the output ports of the power divider, isolation between the ports can be greatly improved. In some implementations, the stripline power divider structure is embedded into the SIW as internal layering. In this respect, the subject disclosure provides for disposing a resistor layer interposed between the internal layers of the stripline power divider structure.

In some aspects, the SIW power divider with the Wilkinson-type topology may require isolation characteristics that are more demanding at higher frequencies, such as millimeter-wave frequencies. In prior approaches, a Surface Mounted Device (SMD) resistor can be added to a top layer of the Wilkinson-type power divider circuit. However, the SMD resistor does not provide adequate isolation characteristics at millimeter wave frequencies and requires additional assembly processes. In this respect, the subject disclosure also provides for disposing a resistor layer within internal layers of the SIW, and connecting the embedded resistor layer to the SIW body by through-hole vias. This embedded resistor plane configuration can have several benefits over prior approaches. For example, the Wilkinson-type power divider can be compatible with existing Printed Circuit Board (PCB) fabrication processes, and thereby, not require any additional fabrication processes. The subject embedded resistor layer may have more, well-defined transmission line characteristics than SMD resistors. In some implementations, the embedded resistor plane can be disposed as an outer layer of the SIW with greater performance, compared to the SMD resistor.

In some aspects, vertical transitions, such as through-hole via structures, are added into the SIW to reach internal layers within the SIW. However, such vertical transitions may produce a stub effect that causes an unwanted shorting of a desired frequency band. By implementing a stack up configuration of the layers with proper layer ordering, layer thickness, and layer placement of the stripline structure within the internal layers of the SIW, the vertical transition between the layers can be implemented with a target wideband response, while having shifted the stop band frequency to lower frequencies. The subject technology may be applicable to any high-frequency antenna systems that need to reach internal layers for routing, such as phased array antennas.

In various examples described herein below, a phased array antenna generates a narrow, directed beam that can be steered to any angle (e.g., in a range of 0 degrees)(° to 360°) across a Field of View (FoV) to detect objects. Beam steering is accomplished with the use of phase shifters coupled to the antenna elements. Power and low noise amplifiers adjust the gain of the antenna to provide beams for both short and long ranges (e.g., greater than (>) 250 meters (m)). The phase array antenna includes a lattice array of radiating elements, a transmission array, and a feed structure. The feed structure distributes a transmission signal throughout the antenna array structure, in which the transmission signal propagates along vertical transitions that feed transmission signals through the different layers to a lattice array of radiating elements, such as, for example, meta-structure unit cells. A meta-structure (MTS), as generally defined herein, is an engineered, non- or semi-periodic structure that is spatially distributed to meet a specific phase and frequency distribution. In some implementations, the meta-structures include metamaterials. In this way, there are multiple layers of radiating elements, including the meta-structure layer(s). The radiating layers may be fed from multiple sides, such as orthogonal feed distribution networks. In this way, beam steering is supported in multiple dimensions. In some implementations, the feed structure includes the stripline power divider circuit with embedded resistor plane as will be described in the present disclosure in more detail.

The subject technology is applicable in wireless communication and radar applications, and in particular, those incorporating meta-structures capable of manipulating electromagnetic waves using engineered-radiating structures. For example, the present disclosure provides for antenna structures having MTS elements and arrays. There are structures and configurations within a feed network to the MTS elements that increase performance of the antenna structures in many applications, including vehicular radar modules. In various examples, the MTS elements include metamaterial elements.

Metamaterials derive their unusual properties from structure rather than composition, and they possess exotic properties not usually found in nature. The metamaterials are structures engineered to have properties not found in nature. The metamaterial antennas may take any of a variety of forms, some of which are described herein for comprehension; however, this is not an exhaustive compilation of the possible implementations of the present disclosure. Metamaterials are typically arranged in repeating patterns. For antennas, metamaterials may be built at scales much smaller than the wavelengths of transmission signals radiated by the metamaterial. Metamaterial properties come from the engineered and designed structures, rather than from the base material forming the structures. Precise shape, dimensions, geometry, size, orientation, arrangement, and so forth result in the smart properties capable of manipulating electromagnetic (EM) waves by blocking, absorbing, enhancing, or bending waves.

The subject technology relates to smart active antennas with unprecedented capability of manipulating Radio Frequency (RF) waves to scan an entire environment in a fraction of the time of current systems. The subject technology also relates to smart beam steering and beam forming using MTS radiating structures in a variety of different configurations, in which electrical changes to the antenna are used to achieve phase shifting and adjustment, thereby reducing the complexity and processing time and enabling fast scans of up to approximately a 360° field of view for long range object detection. The subject technology uses radar to provide information for two-dimensional (2D) image capability as they measure the range and the azimuth angle, thereby providing distance to an object and an azimuth angle identifying a projected location on a horizontal plane, respectively, without the use of traditionally large antenna elements.

The present disclosure relates to radiating structures, such as for radar and cellular antennas, that provide enhanced phase shifting of the transmitted signal to achieve transmission in the autonomous vehicle communication and detection spectrum, which in the United States (US) is approximately 77 GHz and has a 5 GHz range, specifically, 76 GHz to 81 GHz, to reduce the computational complexity of the system, and to increase the transmission speed. The disclosure is not limited to these applications and may be readily employed in other antenna applications, such as wireless communications, fifth generation (5G) cellular, fixed wireless, and so forth. In some implementations, the present disclosure accomplishes these goals by taking advantage of the properties of MTS elements coupled with novel feed structures.

Autonomous driving is quickly moving from the realm of science fiction to becoming an achievable reality. Already in the market are Advanced-Driver Assistance Systems (ADAS) that automate, adapt, and enhance vehicles for safety and better driving. The next step will be vehicles that increasingly assume control of driving functions such as steering, accelerating, braking, and monitoring the surrounding environment and driving conditions to respond to events, such as changing lanes or speed when needed to avoid traffic, crossing pedestrians, animals, and so on.

The present disclosure relates to automotive radar sensors capable of reconstructing the world around them and are effectively a radar "digital eye," having true three-dimensional (3D) vision and capable of providing a human-like interpretation of the world. For example, the subject technology supports autonomous driving with improved sensor performance, all-weather/all-condition detection, advanced decision-making algorithms, and interaction with other sensors through sensor fusion. These configurations optimize the use of radar sensors, as radar is not inhibited by weather conditions in many applications, such as for self-driving cars. The ability to capture environmental information early aids control of a vehicle, allowing anticipation of hazards and changing conditions. The sensor performance is also enhanced with these structures, thereby enabling long-range and short-range visibility to the controller. In an automotive application, short-range is considered to be within 30 meters of a vehicle, such as to detect a person located in a crosswalk directly in front of the vehicle; and long-range is considered to be 250 meters or more, such as to detect approaching cars on a highway.

The present disclosure relates to methods, systems, and apparatuses for a stripline distribution network with embedded resistor plane for millimeter-wave applications. In one or more examples, a feed distribution network comprises a plurality of ground planes, and a signal plane, coupled to the plurality of ground planes, configured to serve as a feed to an antenna array. In one or more examples, the signal plane comprises an input transmission line and a plurality of output transmission lines coupled to the input transmission line. The feed distribution network further comprises a resistor plane interposed between the signal plane and at least one ground plane of the plurality of ground planes. In one or more examples, the resistor plane is configured to isolate the signal plane from the antenna array, and to match a characteristic impedance between the input transmission line and the plurality of output transmission lines.

In at least one example, the feed distribution network further comprises a plurality of through-hole vias penetrating through a plurality of layers in the feed distribution network including the plurality of ground planes and the signal plane. In one or more examples, the signal plane is interposed between a first ground plane of the plurality of ground planes and a second ground plane of the plurality of ground planes, where the signal plane is electrically coupled to the first ground plane and the second ground plane through at least one through-hole via of the plurality of through-hole vias.

In one or more examples, the feed distribution network has a T-junction topology. In some examples, the feed distribution network has a Wilkinson-type topology. In at least one example, the feed distribution network further comprises a plurality of isolation layers coupled to the signal plane and to the plurality of ground planes, where the resistor plane is interposed between a first isolation layer of the plurality of isolation layers and the signal plane. In some examples, the antenna array is tuned to at least one of transmit or receive signals in the millimeter-wave frequency range. In one or more examples, the input transmission line and the plurality of output transmission lines operate together as a power divider to divide signals. In some examples, the input transmission line and the plurality of output transmission lines operate together as a combiner to combine signals.

In at least one example, a method for operating an antenna structure comprises propagating at least a portion of an input transmission signal through one input transmission line of a plurality of input transmission lines in a feed distribution network. The method further comprises dividing, by one power divider of a plurality of power dividers in the feed distribution network, at least one portion of the input transmission signal to generate a first output transmission signal and a second output transmission signal. Also, the method comprises propagating the first output transmission signal through a first output transmission line of a plurality of output transmission lines in the feed distribution network. In addition, the method comprises propagating the second output transmission signal through a second output transmission line of the plurality of output transmission lines in the feed distribution network. Also, the method comprises isolating, by one resistor of a plurality of resistors in the feed distribution network, a port of the first output transmission line from a port of the second output transmission line. Further, the method comprises matching, by the one resistor, an impedance of the one input transmission line with the first output transmission line and the second output transmission line to reduce reflection components in at least one of the input transmission signal, the first output transmission signal, or the second output transmission signal. In one or more examples, the one resistor is coupled between the first output transmission line and the second output transmission line.

In one or more examples, the method further comprises generating, by a transmission signal controller, the input transmission signal. In some examples, the method further comprises amplifying, by a power amplifier (PA), the input transmission signal. In at least one example, the method further comprises shifting, by a phase shifter of a plurality of phase shifters in the feed distribution network, a phase of the first output transmission signal to at least one of steer or adjust a beamwidth of at least one radiated transmit antenna beam. In one or more examples, the method further comprises shifting, by a phase shifter of a plurality of phase shifters in the feed distribution network, a phase of the second output transmission signal to at least one of steer or adjust a beamwidth of at least one radiated transmit antenna beam. In some examples, the method further comprises radiating, by at least one antenna element in an array of antenna elements, the first output transmission signal and the second output transmission signal to generate at least one transmit antenna beam.

In at least one example, a method for operating an antenna structure comprises receiving, by at least one antenna element in an array of antenna elements, a first input receive signal and the second input receive signal. The method further comprises propagating the first input receive signal through a first input receive line of a plurality of input receive lines in a feed distribution network. Also, the method comprises propagating the second input receive signal through a second input receive line of the plurality of input receive lines in the feed distribution network. In addition, the method comprises combining, by one combiner of a plurality of combiners in the feed distribution network, the first input receive signal and the second input receive signal to generate an output receive signal. Also, the method comprises propagating the output receive signal through one output receive line of a plurality of output receive lines in the feed distribution network. Additionally, the method comprises isolating, by one resistor of a plurality of resistors in the feed distribution network, a port of the first input receive line from a port of the second input receive line. Also, the method comprises matching, by the one resistor, an impedance of the one output receive line with the first input receive line and the second input receive line to reduce reflection components in at least one of the first input receive signal, the second input receive signal, or the output receive signal. In one or more examples, the one resistor is coupled between the first input receive line and the second input receive line.

In one or more examples, the method further comprises amplifying, by at least one low noise amplifier (LNA), at least a portion of the output receive signal. In some examples, the method further comprises shifting, by a phase shifter of a plurality of phase shifters in the feed distribution network, a phase of the first input receive signal to at least one of steer or adjust a beamwidth of at least one receive antenna beam. In one or more examples, the method comprises shifting, by a phase shifter of a plurality of phase shifters in the feed distribution network, a phase of the second input receive signal to at least one of steer or adjust a beamwidth of at least one receive antenna beam. In some examples, the method further comprises receiving, by at least one antenna element in the array of antenna elements, at least one receive antenna beam comprising the first input receive signal and the second input receive signal.

The detailed description set forth below is intended as a description of various configurations of the subject technology, and is not intended to represent the only configurations in which the subject technology may be practiced. The appended drawings are incorporated herein, and constitute a part of the detailed description. The detailed description includes specific details for the purpose of providing a thorough understanding of the subject technology. However, the subject technology is not limited to the specific details set forth herein, and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

FIG. 1 illustrates an example environment in which a beam-steering radar 106 in an autonomous vehicle (e.g., ego vehicle) 100 is used to detect and identify objects, according to various implementations of the subject technology. Ego vehicle 100 is an autonomous vehicle with a beam-steering radar system 106 for transmitting a radar signal to scan a FoV or specific area. As described in more detail below, the radar signal is transmitted according to a set of scan parameters that can be adjusted to result in multiple transmission beams 118. The scan parameters may include, among other things, the total angle of the scanned area defining the FoV, the beamwidth or the scan angle of each incremental transmission beam, the number of chirps in the radar signal, the chirp time, the chirp segment time, the chirp slope, and so on. The entire FoV, or a portion of it, can be scanned by a compilation of such transmission beams 118, which may be in successive adjacent scan positions, or in a specific or random order. Note that the term FoV is used herein in reference to the radar transmissions, and does not imply an optical FoV with unobstructed views. The scan parameters may also indicate the time interval between these incremental transmission beams, as well as the start and stop angle positions for a full or partial scan.

In various examples, the ego vehicle 100 may also have other perception sensors, such as a camera 102 and a light detection and ranging radar (lidar) 104. These perception sensors are not required for the ego vehicle 100, but may be useful in augmenting the object detection capabilities of the beam-steering radar 106. The camera 102 may be used to detect visible objects and conditions and to assist in the performance of various functions. The lidar 104 can also be used to detect objects and provide this information to adjust control of the ego vehicle 100. This information may include information such as congestion on a highway, road conditions, and other conditions that would impact the sensors, actions, or operations of the vehicle. Existing ADAS modules utilize camera sensors to assist drivers in driving functions such as parking (e.g., in rear-view cameras). Cameras are able to capture texture, color, and contrast information at a high level of detail; but similar to the human eye, they are susceptible to adverse weather conditions and variations in lighting. For example, the camera 102 may have a high resolution but may not resolve objects beyond 50 meters.

Lidar sensors typically measure the distance to an object by calculating the time taken by a pulse of light to travel to an object and back to the sensor. When positioned on top of a vehicle, a lidar sensor can provide a 360° 3D view of the surrounding environment. Other approaches may use several lidars located at different locations around the vehicle to provide a full 360° view. However, lidar sensors, such as lidar 104, are still prohibitively expensive, bulky in size, sensitive to weather conditions, and are limited to short ranges (e.g., less than 150-300 meters). Radars, on the other hand, have been used in vehicles for many years and operate in all-weather conditions. Radar sensors also require far less processing than the other types of sensors, and have the advantage of detecting objects behind obstacles and determining the speed of moving objects. When it comes to resolution, the laser beams emitted by the lidar 104 are focused on small areas, have a smaller wavelength than RF signals, and can achieve around 0.25 degrees of resolution.

In various examples and as described in more detail below, the beam-steering radar 106 can provide a 360° true 3D view and human-like interpretation of the path and surrounding environment of the ego vehicle 100. The beam-steering radar 106 is capable of shaping and steering RF beams in all directions within a 360° FoV using at least one beam-steering antenna, and is capable of recognizing objects quickly and with a high degree of accuracy over a long range of around 300 meters or more. The short-range capabilities of the camera 102 and the lidar 104 along with the long-range capabilities of the radar 106 enable a sensor fusion module 108, in the ego vehicle 100, to enhance its object detection and identification.

As illustrated, the beam steering radar 106 can detect vehicle 120 located at a far range (e.g., greater than 350 m) as well as a vehicles 110 and 114 located at a short range (e.g., less than 100 m). Detecting the vehicles 120, 110, 114 in a short amount of time, and with enough range and velocity resolution is imperative for full autonomy of driving functions of the ego vehicle 100. The radar 106 has an adjustable Long-Range Radar (LRR) mode that enables the detection of long-range objects in a very small amount time and then to focus on obtaining finer velocity resolution for the detected vehicles. Although not described herein, radar 106 is capable of time-alternatively reconfiguring between the LRR and Short-Range Radar (SRR) modes. The SRR mode provides a wide beam with lower gain, but is able to make quick decisions to avoid an accident, assist in parking and downtown travel, and capture information about a broad area of the environment. The LRR mode provides a narrow, directed beam with a long distance, having high gain; this is powerful for high-speed applications, where longer processing time allows for greater reliability. Excessive dwell time for each beam position may cause blind zones, and the adjustable LRR mode ensures that fast object detection can occur at a long range, while maintaining the antenna gain, transmit power, and desired Signal-to-Noise Ratio (SNR) for the radar operation.

Figure 2:
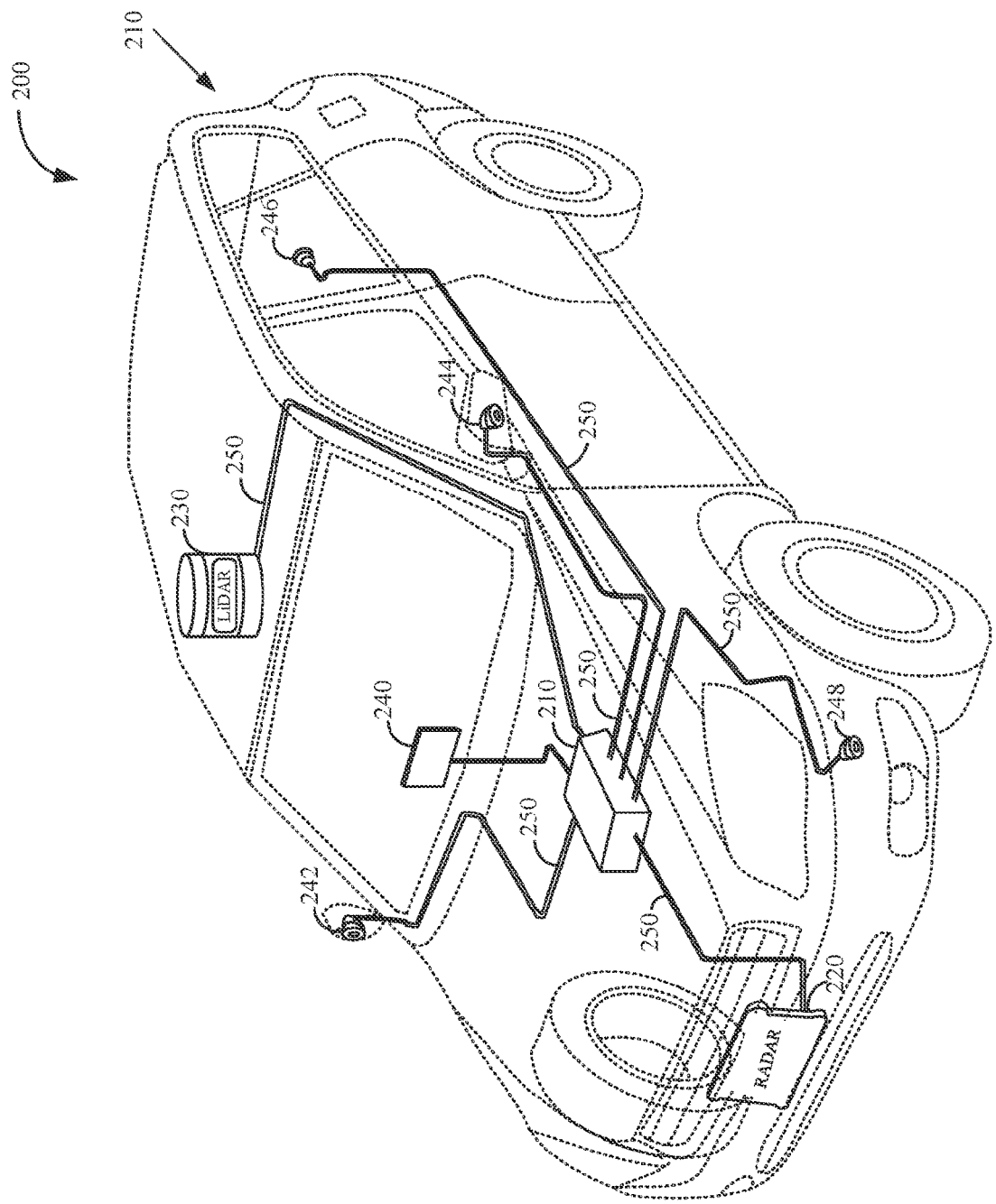
FIG. 2 illustrates an example network environment in which a radar system may be implemented in accordance with one or more implementations of the subject technology.

FIG. 2 illustrates an example network environment 200 within an autonomous vehicle 210 in which a radar system may be implemented in accordance with one or more implementations of the subject technology. The example network environment 200 includes a number of electronic devices 220, 230, 240, 242, 244, 246, and 248 that are coupled to an electronic device 210 via transmission lines 250. The electronic device 210 may communicably couple the electronic devices 242, 244, 246, 248 to one another. In one or more implementations, one or more of the electronic devices 242, 244, 246, 248 are communicatively coupled directly to one another, such as without the support of the electronic device 210. Not all of the depicted components may he required, however, and one or more implementations may include additional components not shown in the figure. Variations in the arrangement and type of the components may be made without departing from the scope of the claims as set forth herein. Additional components, different components, or fewer components may be provided.

In some implementations, one or more of the transmission lines 250 are Ethernet transmission lines. In this respect, the electronic devices 220, 230, 240, 242, 244, 246, 248 and 210 may implement a physical layer (PHY) that is interoperable with one or more aspects of one or more physical layer specifications, such as those described in the Institute of Electrical and Electronics Engineers (IEEE) 802.3 Standards (e.g., 802.3ch). The electronic device 210 may be, or may include, a switch device, a routing device, a hub device, or generally any device that may communicably couple the electronic devices 220, 230, 240, 242, 244, 246, and 248.

In one or more implementations, at least a portion of the example network environment 200 is implemented within a vehicle 210, such as a passenger car. For example, the electronic devices 242, 244, 246, and 248 may include, or may be coupled to, various systems within a vehicle, such as a powertrain system, a chassis system, a telematics system, an entertainment system, a camera system, a sensor system (such as a lane departure system), a diagnostics system, or generally any system that may be used in a vehicle. In FIG. 2, the electronic device 210 is depicted as a central processing unit (CPU), the electronic device 220 is depicted as a radar system, the electronic device 230 is depicted as a lidar system, the electronic device 240 is depicted as an entertainment interface unit, and the electronic devices 242, 244, 246, and 248 are depicted as camera devices, such as forward-view, rear-view, and side-view cameras. In one or more implementations, the electronic device 210 and/or one or more of the electronic devices 242, 244, 246, and 248 may be communicatively coupled to a public communication network, such as the Internet.

Figure 3:
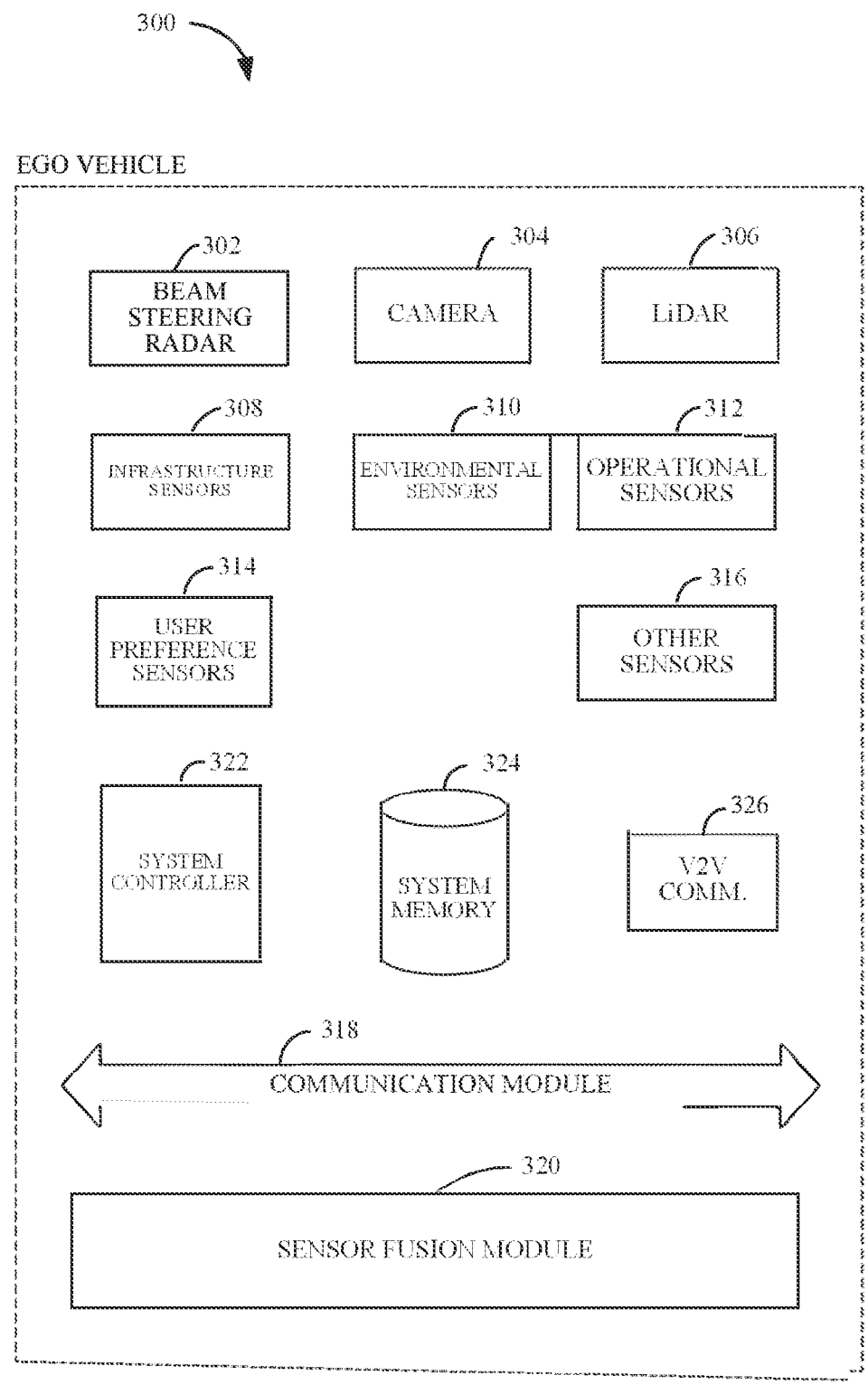
FIG. 3 illustrates a schematic diagram of an autonomous driving system for an ego vehicle, in accordance with various implementations of the subject technology.

Attention is now directed to FIG. 3, which illustrates a schematic diagram of an autonomous driving system 300 for an ego vehicle, in accordance with various implementations of the subject technology. The autonomous driving system 300 is a system for use in an ego vehicle (e.g., the ego vehicle 210 of FIG. 2) that provides some or full automation of driving functions. The driving functions may include, for example, steering, accelerating, braking, and monitoring of the surrounding environment and driving conditions to respond to events, such as changing lanes or speed when needed to avoid traffic, crossing pedestrians, animals, and so on. The autonomous driving system 300 includes a beam-steering radar system 302 and other sensor systems, such as a camera 304, a lidar 306, infrastructure sensors 308, environmental sensors 310, operational sensors 312, user preference sensors 314, and other sensors 316. The autonomous driving system 300 also includes a communications module 318, a sensor fusion module 320, a system controller 322, a system memory 324, and a Vehicle-to-Vehicle (V2V) communications module 326. It is appreciated that this configuration of the autonomous driving system 300 is an example configuration and is not meant to be limited to the specific structure illustrated in FIG. 3. As such, additional systems and modules not shown in FIG. 3 may be included in autonomous driving system 300.

In various examples, the beam-steering radar 302 includes at least one beam steering antenna for providing dynamically controllable and steerable beams that can focus on one or multiple portions of a 360° FoV of the vehicle. The beams radiated from the beam-steering antenna are reflected back from objects in the vehicle's path and surrounding environment, and are received and processed by the radar 302 to detect and identify the objects. The radar 302 includes a perception module that is trained to detect and identify objects, and to control the radar module as desired. The camera 304 and lidar 306 may also be used to identify objects in the path and surrounding environment of the ego vehicle, albeit at a much lower range.

Infrastructure sensors 308 may provide information from the infrastructure while driving, such as from a smart-road configuration, billboard information, traffic alerts, and indicators, including traffic lights, stop signs, traffic warnings, and so forth. This is a growing area, and the uses and capabilities derived from this information are immense. Environmental sensors 310 detect various conditions outside, such as temperature, humidity, fog, visibility, precipitation, among others. Operational sensors 312 provide information about the functional operation of the vehicle. This may include tire pressure, fuel levels, brake wear, and so forth. The user preference sensors 314 may detect conditions that are part of a user preference. This may include temperature adjustments, smart window shading, etc. Other sensors 316 may include additional sensors for monitoring conditions in and around the ego vehicle.

In various examples, the sensor fusion module 320 optimizes these various functions to provide an approximate comprehensive view of the ego vehicle and its environments. Many types of sensors may be controlled by the sensor fusion module 320. These sensors may coordinate with each other to share information and to consider the impact of one control action on another system. In one example, in a congested driving condition, a noise detection module (not shown) (e.g., may be within the other sensors 316) may identify that there are multiple radar signals that may interfere with the vehicle. This information may be used by a perception module, in the radar 302, to adjust the scan parameters of the radar 302 to avoid these other signals and minimize the interference.

In another example, environmental sensor 310 may detect that the weather is changing, and visibility is decreasing. In this situation, the sensor fusion module 320 may determine to configure the other sensors to improve the ability of the vehicle to navigate in these new conditions. The configuration may include turning off the camera 304 and/or the lidar 306, and/or reducing the sampling rate of these visibility-based sensors. This effectively places reliance on the sensor(s) adapted for the current situation. In response, the perception module configures the radar 302 for these conditions as well. For example, the radar 302 may reduce the beamwidth to provide a more focused beam and, thus, enable a finer sensing capability.

In various examples, the sensor fusion module 320 may send a direct control to the radar 302 based on historical conditions and controls. The sensor fusion module 320 may also use some of the sensors within the autonomous driving system 300 provide feedback or calibration for the other sensors. In this way, the operational sensor 312 may provide feedback to the perception module and/or to the sensor fusion module 320 to create templates, patterns and control scenarios. These may be based on successful actions, or may be based on poor results, where the sensor fusion module 320 learns from past actions.

Data from the sensors 302, 304, 306, 308, 310, 312, 314, and 316 may be combined in the sensor fusion module 320 to improve target detection and identification performance of the autonomous driving system 300. The sensor fusion module 320 may itself be controlled by the system controller 322, which may also interact with and control the other modules and systems in the ego vehicle. For example, the system controller 322 may power on or off the different sensors 302, 304, 306, 308, 310, 312, 314, and 316 as desired, or may provide instructions to the ego vehicle to stop driving upon the identification of a driving hazard (e.g., a deer, a pedestrian, a cyclist, flying debris, or another vehicle suddenly appearing within the vehicle's path).

All modules and systems in the autonomous driving system 300 communicate with each other through the communication module 318. The system memory 324 may store information and data (e.g., static and dynamic data) used for the operation of the autonomous driving system 300 and the ego vehicle using the autonomous driving system 300. The V2V communications module 326 is used for communication with other vehicles. The V2V communications module 326 may also obtain information from other vehicles that is non-transparent to the user, driver, or rider of the ego vehicle, and may help the vehicles coordinate with one another to avoid any type of collision.

Figure 4:
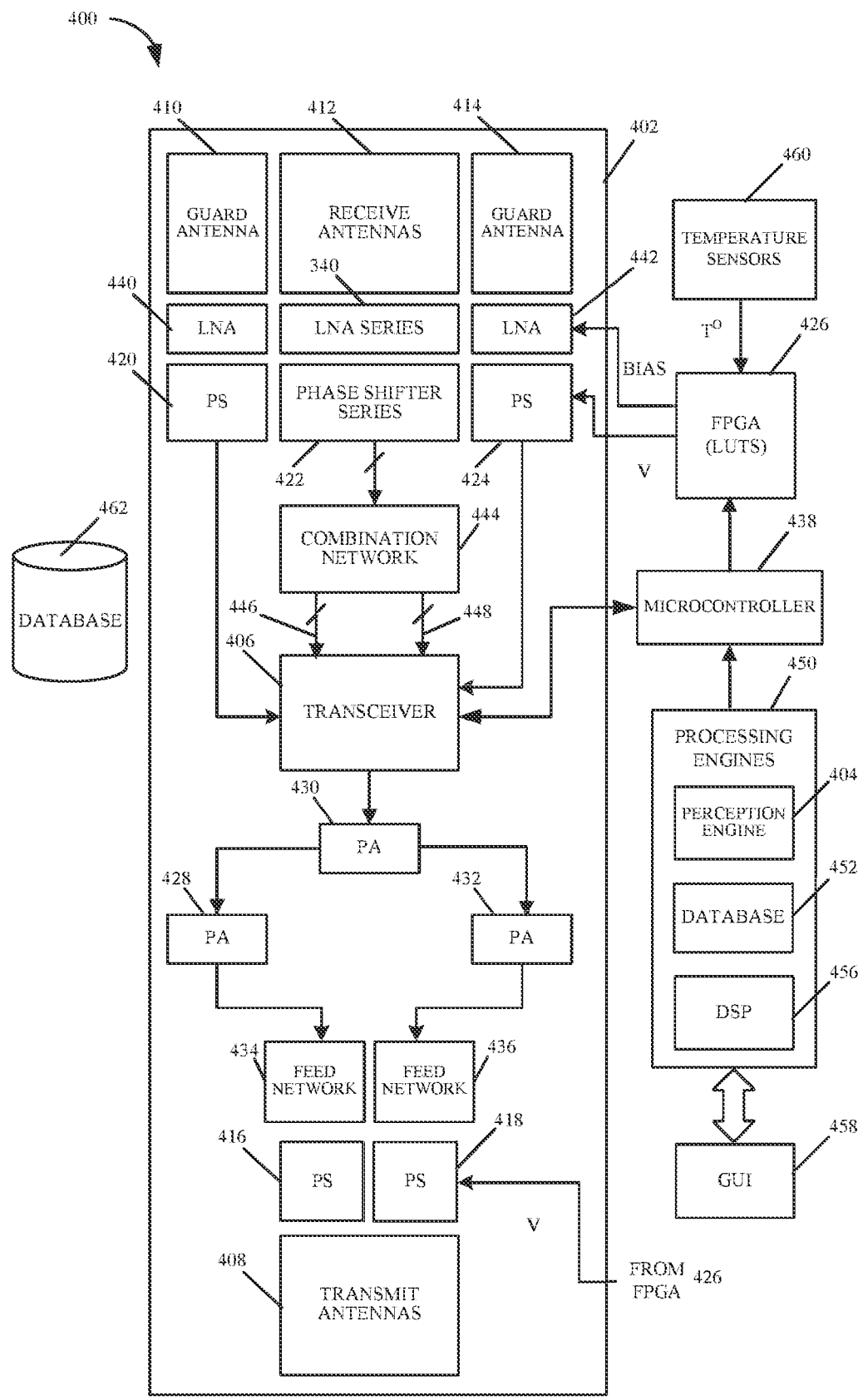
FIG. 4 illustrates a schematic diagram of a radar system, in accordance with various implementations of the subject technology.

FIG. 4 illustrates a schematic diagram of a radar system 400, in accordance with various implementations of the subject technology. Radar module 402 is capable of both transmitting RF signals within a FoV and receiving the reflections of the transmitted signals as they reflect off of objects in the FoV. With the use of analog beamforming in radar module 402, a single transmit and receive chain can be used effectively to form a directional, as well as a steerable, beam. A transceiver 406 in radar module 402 is adapted to generate signals for transmission through a series of transmit antennas 408 as well as manage signals received through a series of receive antennas 410, 412, 414, which include guard antennas 410, 414 (which will be discussed in detail below). Beam steering within the FoV is implemented with the phase shifter (PS) circuits 416, 418 coupled to the transmit antennas 408 on the transmit chain, and with the PS circuits 420, 422, 424 coupled to the receive antennas 410, 412, 414 on the receive chain. Careful phase and amplitude calibration of the transmit antennas 408 and receive antennas 410, 412, 414 can be performed with the use of couplers integrated into the radar module 402 as described in more detail below.

The use of PS circuits 416, 418 and 420, 422, 424 enables separate control of the phase of each element in the transmit antennas 408 and the receive antennas 410, 412, 414, respectively. Unlike early passive architectures, the beam is steerable not only to discrete angles but to any angle (i.e., from 0° to 360°) within the FoV using the active beamforming antennas. A multiple element antenna can be used along with an analog beamforming architecture, where the individual antenna elements may be combined or divided at the port of the single transmit or receive chain without the need for additional hardware components or individual digital processing for each antenna element. Further, the flexibility of multiple element antennas allows for a narrow beamwidth for transmit and receive. The antenna beamwidth decreases with an increase in the number of antenna elements. A narrow beam improves the directivity of the antenna, and provides the radar system 400 with a significantly longer detection range.

The major challenge with implementing analog beam steering is to design PSs to operate at 77 GHz. PS circuits 416, 418 and 420, 422, 424 solve this problem by employing a reflective PS design implemented with a distributed varactor network, currently built using Gallium-Arsenide (GaAs) materials. Each PS circuit 416, 418 and 420, 422, 424 has a series of PSs, with each PS coupled to an antenna element to generate a phase shift value of anywhere from 0° to 360° for signals transmitted or received by the antenna element. The PS design is scalable for future implementations to other semiconductor materials, such as Silicon-Germanium (SiGe), and may use complementary metal-oxide-semiconductor (CMOS) technology in some implementations, thereby bringing down the PS cost to meet specific demands of customer applications. Each PS circuit 416, 418 and 420, 422, 424 is controlled by a Field Programmable Gate Array (FPGA) 426, which provides a series of voltages to the PSs in each PS circuit that results in a series of phase shifts.

In various examples, a voltage value is applied to each PS in the PS circuits 416, 418 and 420, 422, 424 to generate a given phase shift and provide beam steering. The voltages applied to the PSs in PS circuits 416, 418 and 420, 422, 424 are stored in Look-up Tables (LUTs) in the FPGA 406. These LUTs are generated by an antenna calibration process that determines which voltages to apply to each PS to generate a given phase shift under each operating condition. Note that the PSs in PS circuits 416, 418 and 420, 422, 424 can generate phase shifts at a very high resolution of less than one degree. This enhanced control over the phase allows for the transmit antennas 408 and the receive antennas 410, 412, 414 in the radar module 402 to steer beams with a very small step size, thereby improving the capability of the radar system 400 to resolve closely located targets at a small angular resolution.

In various examples, the transmit antennas 408 and the receive antennas 410, 412, 414 may be implemented as a meta-structure antenna, a phase array antenna, or any other antenna capable of radiating RF signals in millimeter wave frequencies. A meta-structure, as generally defined herein, is an engineered structure capable of controlling and manipulating incident radiation at a desired direction based on its geometry. Various configurations, shapes, designs, and dimensions of the antennas 408, 410, 412, 414 may be used to implement specific designs and meet specific constraints.

The transmit chain in radar system 400 starts with the transceiver 406 generating RF signals to prepare for transmission over-the-air by the transmit antennas 408. The RF signals may be, for example, Frequency-Modulated Continuous Wave (FMCW) signals. An FMCW signal enables the radar system 400 to determine both the range to an object and the object's velocity by measuring the differences in phase or frequency between the transmitted signals and the received/reflected signals or echoes. Within FMCW formats, there are a variety of waveform patterns that may be used, including sinusoidal, triangular, sawtooth, rectangular, and so forth, each having various advantages and purposes.

Once the FMCW signals are generated by the transceiver 406, they are provided to power amplifiers (PAs) 428, 430, 432. Signal amplification is needed for the FMCW signals to reach the long ranges desired for object detection, as the signals attenuate as they radiate by the transmit antennas 408. From the PAs 428, 430, 432, the signals are divided and distributed through feed networks 434, 436, which together form a power divider system to divide an input signal into multiple signals, one for each element of the transmit antennas 408. The feed networks 434, 436 may divide the signals so that power is equally distributed amongst them or, alternatively, so that power is distributed according to another scheme, in which the divided signals do not all receive the same power. Each signal from the feed networks 434, 436 is then input into a PS in PS circuits 416, 418, where they are phase shifted based on voltages generated by the FPGA 426 under the direction of microcontroller 438, and then transmitted through transmit antennas 408.

Microcontroller 438 determines which phase shifts to apply to the PSs in PS circuits 416, 418 according to a desired scanning mode based on road and environmental scenarios. Microcontroller 438 also determines the scan parameters for the transceiver to apply at its next scan. The scan parameters may be determined at the direction of one of the processing engines 450, such as at the direction of perception engine 404. Depending on the objects detected, the perception engine 404 may instruct the microcontroller 438 to adjust the scan parameters at a next scan to focus on a given area of the FoV, or to steer the beams to a different direction.

In various examples and as described in more detail below, radar system 400 operates in one of various modes, including a full scanning mode and a selective scanning mode, among others. In a full scanning mode, the transmit antennas 408 and the receive antennas 410, 412, 414 scan a complete FoV with small incremental steps. Even though the FoV may be limited by system parameters due to the increased side lobes size as a function of the steering angle, radar system 400 is able to detect objects over a significant area for a long-range radar. The range of angles to be scanned on either side of the boresight as well as the step size between the steering angles/phase shifts can be dynamically varied based on the driving environment. To improve performance of an autonomous vehicle (e.g., an ego vehicle, such as vehicle 210 of FIG. 2) driving through an urban environment, the scan range can be increased to keep monitoring the intersections and curbs to detect vehicles, pedestrians, or bicyclists. This wide scan range may deteriorate the frame rate (e.g., revisit rate), but is considered acceptable as the urban environment generally involves low velocity driving scenarios. For a high-speed freeway scenario, where the frame rate is critical, a higher frame rate can be maintained by reducing the scan range. In this case, a few degrees of beam scanning on either side of the boresight would suffice for long-range target detection and tracking.

In a selective scanning mode, the radar system 400 scans around an area of interest by steering to a desired angle, and then scanning around that angle. This ensures that the radar system 400 detects objects in the area of interest, without wasting any processing or scanning cycles illuminating areas with no valid objects. Since the radar system 400 can detect objects at a long distance (e.g., 400 m or more at the boresight), if there is a curve in the road, direct measures do not provide helpful information. Rather, the radar system 400 steers along the curvature of the road and aligns its beams towards the area of interest. In various examples, the selective scanning mode may be implemented by changing the chirp slope of the FMCW signals generated by the transceiver 406, and by shifting the phase of the transmitted signals to the steering angles needed to cover the curvature of the road.

Objects are detected with radar system 400 by reflections or echoes that are received at the series of receive antennas 410, 412, 414, which are directed by PS circuits 420, 422, 424. Low noise amplifiers (LNAs) 440, 340, 442, which include an LNA series 340, are positioned between the receive antennas 410, 412, 414 and the PS circuits 420, 422, 424, which include PSs similar to the PSs in PS circuits 416, 418. For receive operation, PS circuits 410, 422, 424 create phase differentials between radiating elements in the receive antennas 410, 412, 414 to compensate for the time delay of the received signals between the radiating elements due to spatial configurations. Receive phase-shifting, also referred to as analog beamforming, combines the received signals for aligning echoes to identify the location, or position, of a detected object. That is, phase shifting aligns the received signals that arrive at different times at each of the radiating elements in receive antennas 410, 412, 414. Similar to PS circuits 416, 418 on the transmit chain, PS circuits 420, 422, 424 are controlled by FPGA 426, which provides the voltages to each PS to generate the desired phase shift. FPGA 426 also provides bias voltages to the LNAs 440, 340, 442.

The receive chain then combines the signals received at receive antennas 412 at the combination network 444, from which the combined signals propagate to the transceiver 406. Note that as illustrated, combination network 444 generates two combined signals 446, 448, with each signal combining signals from a number of elements in the receive antennas 412. In one example, receive antennas 412 include 48 radiating elements, and each combined signal 446, 448 combines signals received by 34 of the 48 elements. Other examples may include 8 radiating elements, 26 radiating elements, 34 radiating elements, 42 radiating elements, and so on, depending on the desired configuration. The higher the number of antenna elements, the narrower the beamwidth.

Note also that the signals received at the receive antennas 410 and 414 (i.e. guard antennas) go directly from PS circuits 420 and 424 to the transceiver 406. Receive antennas 410 and 414 are guard antennas that generate a radiation pattern separate from the main beams received by the 48-element receive antenna 412. Guard antennas 410 and 414 are implemented to effectively eliminate side-lobe returns from objects. The goal is for the guard antennas 410 and 414 to provide a gain that is higher than the side lobes such that the presence of the side lobes is eliminated or reduced significantly. As such, the guard antennas 410 and 414 can effectively act as a side lobe filter.

Once the received signals are received by the transceiver 406, the received signals are processed by processing engines 450. Processing engines 450 include perception engine 404 that detects and identifies objects in the received signal using one or more neural networks employing machine learning or computer vision techniques, database 452 to store historical and other information for the radar system 400, and a Digital Signal Processing (DSP) engine 456 comprising an Analog-to-Digital Converter (ADC) module to convert the analog signals from the transceiver 406 into digital signals that can be processed to determine angles of arrival and other valuable information for the detection and identification of objects by perception engine 404. In one or more implementations, the DSP engine 454 may be integrated within the microcontroller 438 or the transceiver 406.

Radar system 400 also includes a Graphical User Interface (GUI) 458 to enable configuration of the scan parameters, such as the total angle of the scanned area defining the FoV, the beamwidth or the scan angle of each incremental transmission beam, the number of chirps in the radar signal, the chirp time, the chirp slope, the chirp segment time, and so on as desired. In addition, the radar system 400 has a temperature sensor(s) 460 for sensing the temperature around the vehicle so that the proper voltages from the FPGA 426 may be used to generate the desired phase shifts. The voltages stored in the FPGA 426 are determined during calibration of the antennas 408, 410, 412, 414 under different operating conditions, including temperature conditions. A database 462 may also be used in the radar system 400 to store radar and other useful data.

The radar data may be organized in sets of Range-Doppler (RD) map information, corresponding to four-dimensional (4D) information that is determined by each RF beam reflected from targets, such as azimuthal angles, elevation angles, range, and velocity. RD maps may be extracted from the FMCW radar signals, and may contain both noise and systematic artifacts from Fourier analysis of the radar signals. The perception engine 404 controls further operation of the transmit antennas 408 by, for example, providing an antenna control signal containing beam parameters for the next RF beams to be radiated from MTM cells in the transmit antennas 408.

In operation, the microcontroller 438 is responsible for directing the transmit antennas 408 to generate RF beams with determined parameters such as beamwidth, transmit angle, and so on. The microcontroller 438 may, for example, determine the parameters at the direction of the perception engine 404, which may at any given time determine to focus on a specific area of the Field-of-View (FoV) upon identifying targets of interest within the ego vehicle's path or surrounding environment. The microcontroller 438 determines the direction, power, and other parameters of the RF beams and controls the transmit antennas 408 to achieve beam steering in various directions. The microcontroller 438 also determines a voltage matrix to apply to reactance control mechanisms coupled to the transmit antennas 408 to achieve a given phase shift. In some examples, the transmit antennas 408 are adapted to transmit a directional beam through active control of the reactance parameters of the individual MTM cells that make up the transmit antennas 408.

Next, the transmit antennas 408 radiate RF beams having the determined parameters. The RF beams are reflected from targets in and around the ego vehicle's path (e.g., within a 360° field of view), and are received by a transceiver module in the transmit antennas 408. The transmit antennas 408 transmit the received 4D radar data to the perception engine 404 for target identification.

In various examples, the perception engine 404 can store information that describes an FoV. This information may be historical data used to track trends, and anticipate behaviors and traffic conditions, or may be instantaneous or real-time data that describes the FoV at a moment in time or over a window in time. The ability to store this data enables the perception engine 404 to make decisions that are strategically targeted at a particular point or area within the FoV. For example, the FoV may be clear (e.g., no echoes received) for a period of time (e.g., five minutes), and then one echo arrives from a specific region in the FoV; this is similar to detecting the front of a car. In response, the perception engine 404 may determine to narrow the beamwidth for a more focused view of that sector or area in the FoV. The next scan may indicate the target's length or other dimension; and if the target is a vehicle, the perception engine 404 may consider what direction the target is moving and focus the beams on that area. Similarly, the echo may be from a spurious target, such as a bird, which is small and moving quickly out of the path of the vehicle. The database 452, in the perception engine 404, can store useful data for the radar system 400, such as, for example, information on which subarrays of the transmit antennas 408 perform better under certain conditions.

In various examples described herein, the use of the radar system 400 in an autonomous driving vehicle provides a reliable way to detect targets in difficult weather conditions. For example, historically a driver will slow down dramatically in thick fog, as the driving speed decreases along with decreases in visibility. On a highway in Europe, for example, where the speed limit is 515 kilometers per house (km/h), a driver may need to slow down to 50 km/h when visibility is poor. Using the radar system 400, the driver (or driverless vehicle) may maintain the maximum safe speed without regard to the weather conditions. Even if other drivers slow down, a vehicle enabled with the radar system 400 can detect those slow-moving vehicles and obstacles in its path, and avoid/navigate around them.

Additionally, in highly congested areas, it is necessary for an autonomous vehicle to detect targets in a sufficient amount of time to react and take action. The examples provided herein for a radar system (e.g., radar system 400) increase the sweep time of a radar signal so as to detect any echoes in time to react. In rural areas and other areas with few obstacles during travel, the perception engine 404 adjusts the focus of the RF beam to a larger beamwidth, thereby enabling a faster scan of the areas where there are few echoes. The perception engine 404 may detect this situation by evaluating the number of echoes received within a given period of time, and make beam size adjustments accordingly. Once a target is detected, the perception engine 404 determines how to adjust the beam focus. This is achieved by changing the specific configurations and conditions of the transmit antennas 408. In one example scenario, the voltages on the reactance control mechanisms of the reactance control module of the transmit antennas 408 are adjusted. In another example scenario, a subset of unit cells of the transmit antennas 408 is configured as a subarray. This configuration means that this set of unit cells can be treated as a single unit, and that all of the unit cells within the subarray are adjusted similarly. In another scenario, the subarray is changed to include a different number of unit cells, where the combination of unit cells in a subarray may be changed dynamically to adjust to the conditions and operation of the radar system 400.

All of these detection scenarios, analysis, and reactions may be stored in the perception engine 404, such as within the database 452, and used for later analysis or simplified reactions. For example, if there is an increase in the echoes received at a given time of day or on a specific highway, that information is fed into the microcontroller 438 to assist in proactive preparation and configuration of the transmit antennas 408. Additionally, there may be some subarray combinations that perform better, such as to achieve a desired result, and this may be stored in the database 452.

Figure 5:
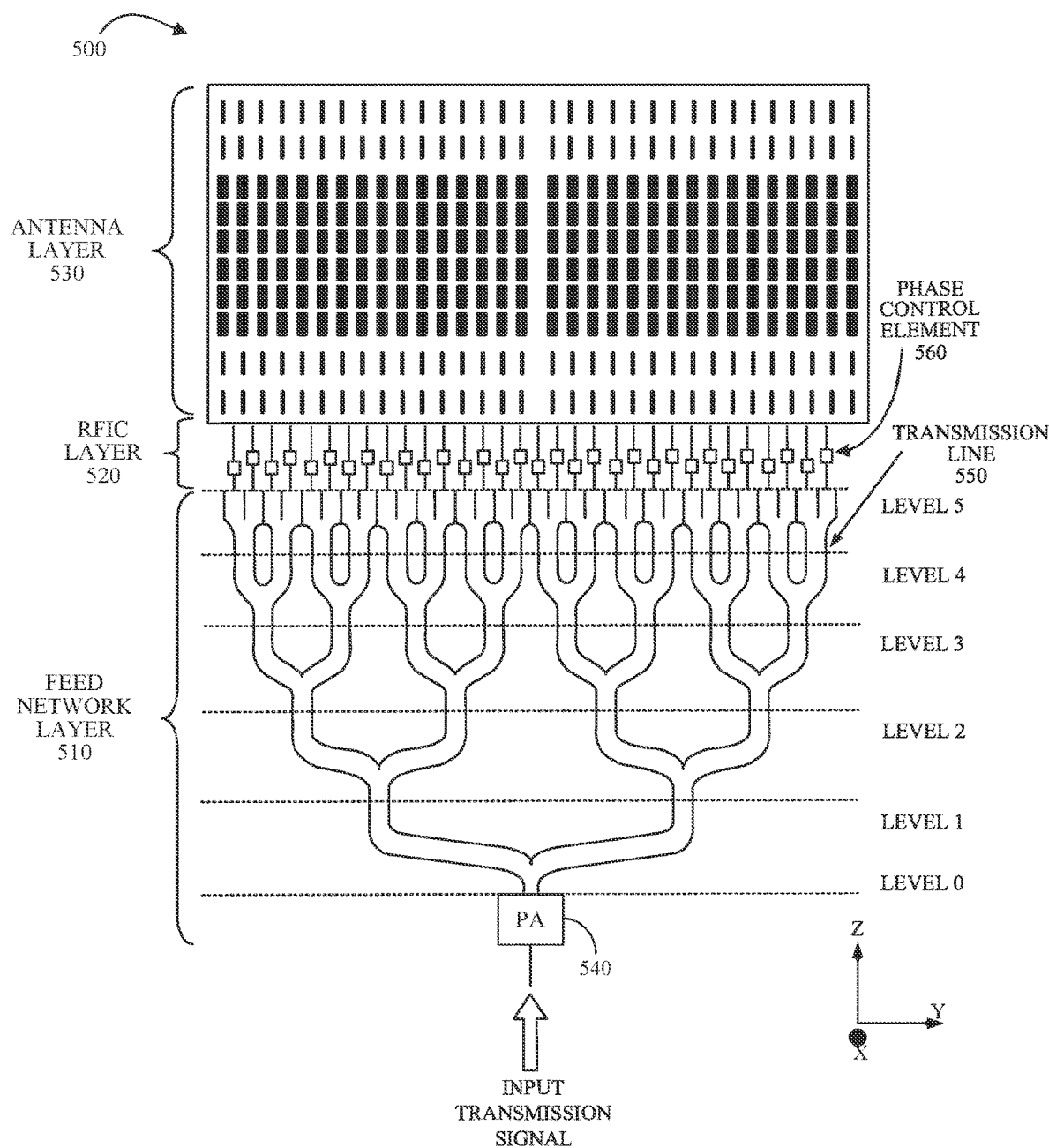
FIG. 5 illustrates a schematic diagram of an antenna structure, according to various implementations of the subject technology.

FIG. 5 illustrates an antenna structure 500, in accordance with some implementations of the subject technology. The antenna structure 500 includes a feed network layer 510, a radio-frequency integrated circuit (RFIC) layer 520, and an antenna layer 530. Not all of the depicted components may he required, however, and one or more implementations may include additional components not shown in the figure. Variations in the arrangement and type of the components may be made without departing from the scope of the claims as set forth herein. Additional components, different components, or fewer components may be provided.

In the illustrated example, the antenna layer 530 is a transmit antenna that comprises a plurality of radiating elements that create transmit paths for transmission of radiating signals to an object at different directions. In various implementations, the radiating elements in the antenna layer 530 are meta-structures or RF antenna patches in an array configuration, such as in a 32-element array transmit antenna. The radiating elements may be coupled to the feed network layer 510 and to phase control elements 560, such as phase shifters.

The feed network layer 510 is a type of a power divider circuit that provides a corporate feed-dividing input transmission signal received from a transmission signal controller (e.g., the microcontroller 438 of FIG. 4) for propagation to the RFIC layer 520. In the illustrated example, a power amplifier (PA) 540 provides signal amplification to the input transmission signal, and the power divider circuit divides the amplified transmission signal through a network of paths or transmission lines 550.

Within the antenna structure 500 is a network of paths, in which each of the division points is identified according to a division level. As depicted in FIG. 5, the feed network layer 510 comprises a first level of transmission lines (depicted as LEVEL 0), a second level of transmission lines (depicted as LEVEL 1), a third level of transmission lines (depicted as LEVEL 2), a fourth level of transmission lines (depicted as LEVEL 3), and a fifth level of transmission lines (depicted as LEVEL 4). Each level of transmission lines in the feed network layer 510 doubles its paths: LEVEL 1 has 2 paths, LEVEL 2 has 4 paths, LEVEL 3 has 5 paths, LEVEL 4 has 16 paths, and LEVEL 5 has 32 paths. In this implementation, the paths have similar dimensions; however, the size of the paths may be configured differently to achieve a desired transmission and/or radiation result. The transmission lines 550 of the feed network layer 510 may reside in a substrate of the antenna structure 500.

In some implementations, the feed network layer 510 is impedance-matched such that the impedances at each end of a transmission line 550 matches the characteristic impedance of the line 550. Each transmission line 550 may be bounded by a set of vias. In some implementations, matching vias are also provided for better impedance matching and phase control. The RFIC layer 520 may provide a reactance control with a varactor, a set of varactors, a phase shift network, or other mechanisms without departing from the scope of the present disclosure. In FIG. 5, the RFIC layer 520 comprises phase control elements 560 for providing phase shifts to the transmission signal propagating from the feed network layer 510 to align the signals in time.

Although the antenna structure 500 was described as a transmit antenna, the antenna structure 500 may include, or operate as, a receive antenna, where the feed network layer 510 may include, or operate as, a combination network that combines received signals from the antenna layer 530 to a transceiver (not shown) for processing. In this respect, the RFIC layer 520 may include LNAs for applying low-noise filtering to the received signals. For example, the antenna layer 530 may include a receive antenna that has a number of radiating elements creating receive paths for signals or reflections from an object at a slightly different time. In various implementations, the radiating elements in the antenna layer 530 are meta-structures or RF antenna patches in an array configuration such as in a 48-element array receive antenna. The radiating elements may be coupled to a combination structure in the feed network layer 510 and to the phase control elements 560, such as phase shifters, and the LNAs. The antenna layer 530 may include more than one receive antenna, such as a 24-element array antenna, to form a 48-element phased array. Other configurations having different numbers of elements may be implemented as well. The receive antennas may have a series of antenna elements that are connected to a series of LNAs and phase shifters, respectively. The combination network may combine the signals from the receive antennas through the phase shifters.

Figure 6:
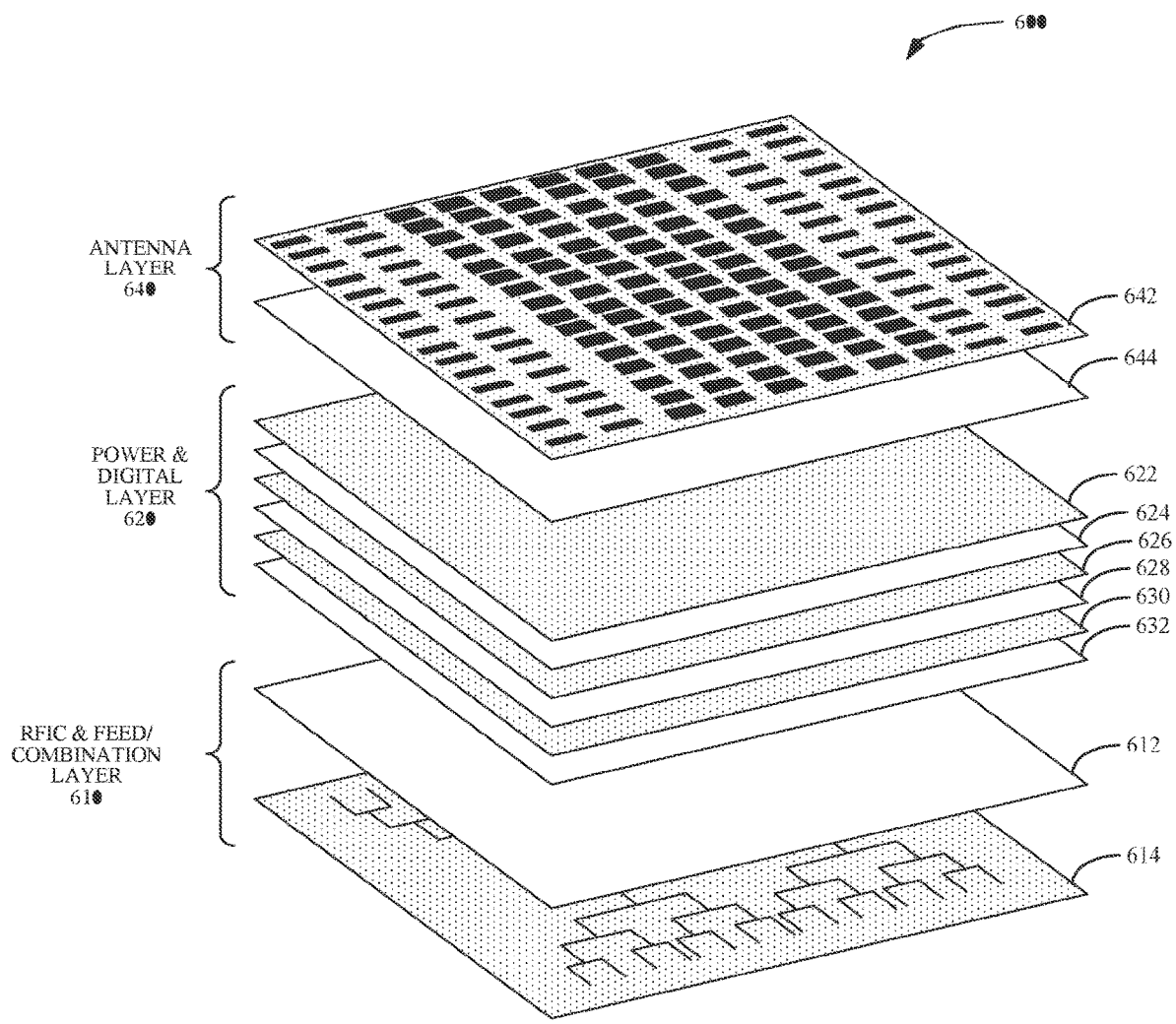
FIG. 6 illustrates an exploded perspective view of an example stack-up configuration of an antenna structure, in accordance with some implementations of the subject technology.

FIG. 6 illustrates an exploded perspective view of an example stack-up configuration of an antenna structure 600, in accordance with some implementations of the subject technology. The antenna structure 600 includes a feed and combination layer (RFIC and feed/combination layer) 610, a power and digital layer 620, and an antenna layer 640. Not all of the depicted components may he required, however, and one or more implementations may include additional components not shown in the figure. Variations in the arrangement and type of the components may be made without departing from the scope of the claims as set forth herein. Additional components, different components, or fewer components may be provided.

The present disclosure is described with respect to a radar system, where the antenna structure 600 is a structure having a corporate feed structure, such as the feed and combination layer 610, with an array of transmission lines feeding a radiating array, such as the antenna layer 640, through the power and digital layer 620. In some implementations, the power and digital layer 620 includes a plurality of transmission lines coupled to power supplies and digital logic circuitry within conductive material, and the antenna layer 640 is a lattice structure of unit cell radiating elements proximate the transmission lines. The feed and combination layer 610 may include a coupling module for providing an input signal to the transmission lines, or to a portion of the transmission lines. In some implementations, the coupling module is a power divider circuit that divides the input signal amongst the plurality of transmission lines, in which the power may be distributed equally among N number of transmission lines, or may be distributed according to another scheme, such that the N number of transmission lines do not all receive a same signal strength.

The feed and combination layer 610 includes a ground plane layer 612 and a signal plane layer 614. The signal plane layer 614 may include a feed network for transmit operations, and a combination network for receive operations. The feed network may include power amplifiers for signal amplification, and the combination network may include LNAs for low-noise signal filtration. The feed network and the combination network are each coupled to respective phase shifter network (not shown) included in the feed and combination layer 610 for beam steering.

In some implementations, one or more of the layers in the feed and combination layer 610 may include a substrate formed of a polytetrafluoroethylene material having predetermined parameters (e.g., low dielectric loss) that are applicable to high frequency circuits. In some aspects, a polytetrafluoroethylene substrate can exhibit thermal and phase stability across various temperatures, and can be used in automotive radar and microwave applications.

The power and digital layer 620 includes signal plane layers 622, 626, and 630, and includes ground plane layers 624, 628, and 632. The signal plane layers 622, 626, and 630 may include power supplies, such as direct current (DC) power and digital logic circuitry. Each of the feed and combination layer 614 and the power and digital layers (e.g., 622, 624, 626, 628, 630, and 632) includes a dielectric layer interposed between two conductive layers. In some aspects, each of the conductive layers and the dielectric layers has a predetermined thickness (e.g., 20 millimeter (mm) for the dielectric layer thickness).

The antenna layer 640 includes an antenna 642 and a ground plane layer 644. The antenna 642 may be a receive antenna or a transmit antenna in the antenna structure 600. The antenna 642 has a number of radiating elements creating paths for transmitted RF signals or reflections received from objects. In various examples, the radiating elements are meta-structures or RF antenna patches in an array configuration, such as in a 32-element array transmit antenna or a 48-element array receive antenna. For example, the antenna 642 may include an array of MTS elements. In another example, the antenna 642 may include an array of RF patch antennas.

The antenna layer 640 may be composed of individual radiating elements discussed herein. The antenna layer 640 may take a variety of forms, and is designed to operate in coordination with the power and digital layer 620, in which the individual radiating elements correspond to elements within the power and digital layer 620. As used herein, the "unit cell element" is referred to as an "MTS unit cell" or an "MTS element," and these terms are used interchangeably throughout the present disclosure without departing from the scope of the subject technology. The MTS unit cells include a variety of conductive structures and patterns, such that a received transmission signal is radiated therefrom. An MTS unit cell may serve as an artificial material, meaning a material that is not naturally occurring. Each MTS unit cell has some unique properties. These properties include a negative permittivity and permeability, thereby resulting in a negative refractive index; these structures are commonly referred to as left-handed materials (LHM). The use of LHM enables behavior not achieved in classical structures and materials. The MTS array is a periodic arrangement of unit cells that are each smaller than the transmission wavelength. In some aspects, each of the unit cell elements has a uniform size and shape; however, alternate and other implementations may incorporate different sizes, shapes, configurations, and array sizes.

The antenna structure 600 may include multiple RFICs embedded into the feed and combination layer 610, such as to correspond to the number of path levels in a feed network or combination network of the feed and combination layer 610, or to correspond to the number of RF patch antennas in the antenna 642. The signal plane layer 614 in the feed and combination layer 610 may include, or be coupled to, a connector (not shown).

The feed and combination layer 610 includes phase shifters (e.g., a varactor, a set of varactors, or a phase shift network) to achieve any desired phase shift in a range of 0° to 360°. The feed and combination layer 610 also includes transitions from the feed and combination layer 610 to the antenna layer 640. In some implementations, the feed and combination layer 610 includes a control circuit. The control circuit may include the reactance control mechanisms, or reactance controller, such as a variable capacitor, to change the reactance of a transmission circuit and, thereby, control the characteristics of the signal propagating through the transmission line. The reactance control mechanisms can act to change the phase of a signal radiated through individual antenna elements of the antenna layer 640. Where there is such an interruption in the transmission line, a transition is made to maintain signal flow in the same direction. Similarly, the reactance control mechanisms may utilize a control signal, such as a DC bias line, or other control means, to enable the antenna structure 600 to control and adjust the reactance of the transmission line. In some implementations, the feed and combination layer 610 includes one or more structures that isolate the control signal from the transmission signal. In the case of an antenna transmission structure, the reactance control mechanisms may serve as the isolation structure to isolate a DC control signal(s) from an alternating current (AC) transmission signal(s).

In one or more implementations, the feed and combination layer 610 incorporates a dielectric substrate to form a transmission path, such as an SIW. In this respect, the feed and combination layer 610 may provide reactance control through integration with the transmission line, such as by insertion of a microstrip, or strip line portion, that couples to a reactance control mechanism (not shown). The feed and combination layer 610 may enable control of the reactance of a fixed geometric transmission line. In some implementations, one or more reactance control mechanisms may be placed within a transmission line. Similarly, the reactance control mechanisms may be placed within multiple transmission lines to achieve a desired result. The reactance control mechanisms may have individual controls, or may have a common control. In some implementations, a modification to a first reactance control mechanism is a function of a modification to a second reactance control mechanism.

As described in the present disclosure, a reactance control mechanism is incorporated to adjust the effective reactance of a transmission line and/or an RF radiating element fed by a transmission line. In some implementations, the reactance control mechanism includes a varactor that changes the phase of a signal. In other implementations, alternate control mechanisms are used. The reactance control mechanism may be, or include at least a portion of, a varactor diode having a bias voltage applied by a controller (not shown). The varactor diode may serve as a variable capacitor when a reverse bias voltage is applied. As used herein, the term "reverse bias voltage" is also referred to herein as a "reactance control voltage" or a "varactor voltage." The value of the reactance, which in this case is capacitance, is a function of the reverse bias voltage value. By changing the reactance control voltage, the capacitance of the varactor diode is changed over a given range of values. Alternate implementations may use alternate methods for changing the reactance, which may be electrically or mechanically controlled. In some implementations, the varactor diode may also be placed between conductive areas of a radiating element. With respect to the radiating element, changes in varactor voltage produce changes in the effective capacitance of the radiating element. The change in effective capacitance changes the behavior of the radiating element, and in this way, the varactor diode may be considered to be a tuning element for the radiating elements in beam formation.

In some implementations, the feed and combination layer 610 includes a capacitance control mechanism controlled by a microcontroller (e.g., microcontroller 438 of FIG. 4) to control the phase of a transmission signal as it radiates from the RF patch antennas in the antenna layer 640. In some implementations, the microcontroller determines a voltage matrix to apply to the reactance control mechanisms within the reactance control mechanism to achieve a given phase shift or other antenna parameters. In some implementations, the antenna layer 640 is adapted to transmit a directional beam without incorporating digital beam forming techniques, but rather through active control of the reactance parameters of the individual unit cell elements that make up the antenna layer 640.

When the transmission signal is provided to the antenna structure 600, such as through a coaxial cable or other connector, the transmission signal propagates through the feed and combination layer 610 to the power and digital layer 620 through which the transmission signal radiates to the antenna layer 640 for transmission through the air. The transmission line may have various portions, in which a first portion receives an transmission signal as an input, such as from a coaxial cable or other supply structure, and the transmission signal traverses a substrate portion to divide the transmission signal through a corporate feed-style network resulting in multiple transmission lines that feed a phase shift network. The phase shift network includes multiple phase control elements having one or more phase shifters. The transmission signal radiates through these phase control elements to the antenna layer 640, which may include an array of MTS elements. Control of the array of MTS elements results in a directed signal or beamform.

Figure 7:
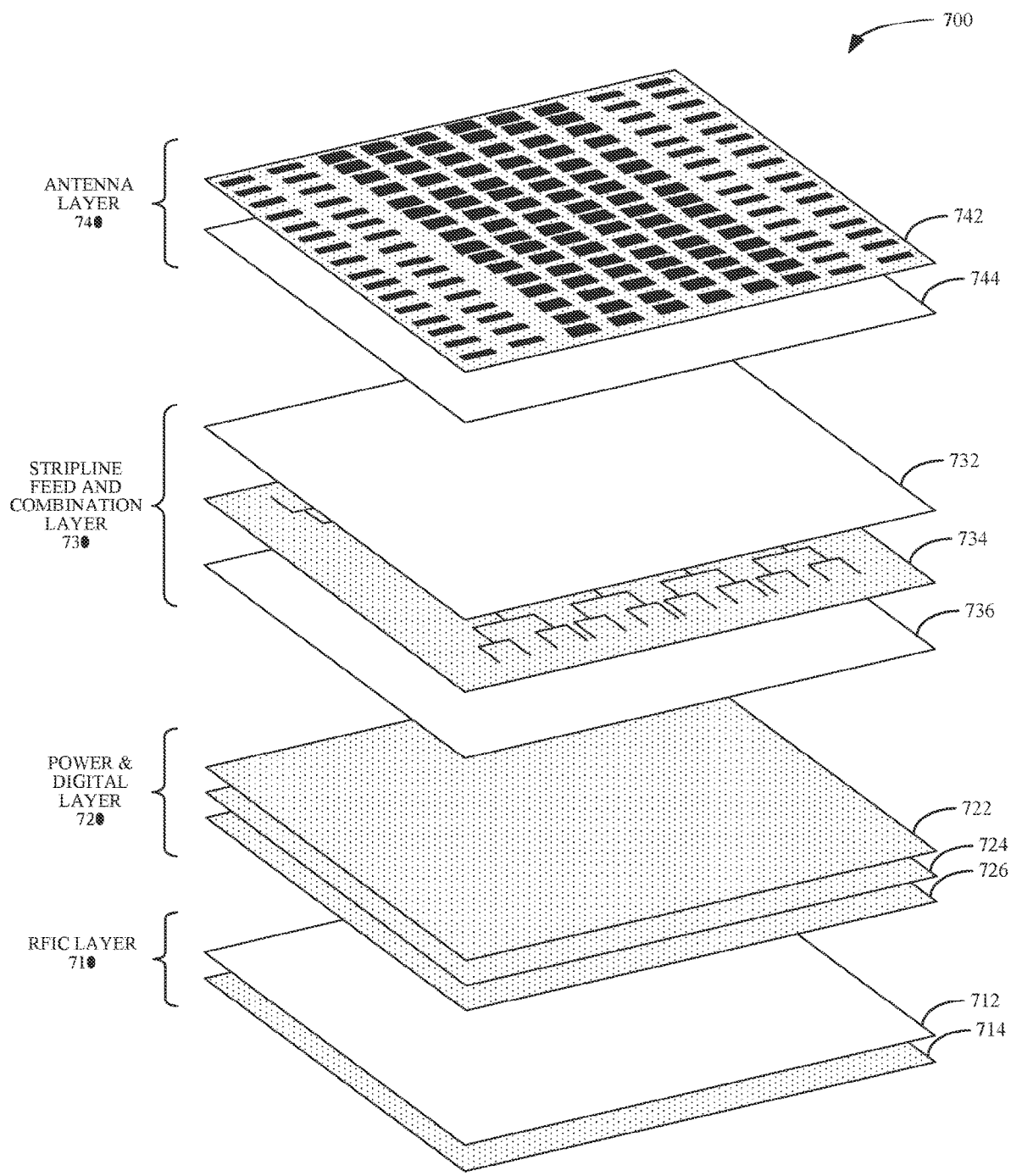
FIG. 7 illustrates an exploded perspective view of an example stack-up configuration of an antenna structure with a stripline feed and combination layer, in accordance with some implementations of the subject technology.

FIG. 7 illustrates an exploded perspective view of an example stack-up configuration of an antenna structure 700 with a stripline feed and combination layer, in accordance with some implementations of the subject technology. The antenna structure 700 includes an RFIC layer 710, a power and digital layer 720, a stripline feed and combination layer 730, and an antenna layer 740. Not all of the depicted components may he required, however, and one or more implementations may include additional components not shown in the figure. Variations in the arrangement and type of the components may be made without departing from the scope of the claims as set forth herein. Additional components, different components, or fewer components may be provided.

The RFIC layer 710 includes a ground plane layer 712 and a signal plane 714. The power and digital layer 720 includes signal plane layers 722, 724, and 726. The signal plane layers 722, 724 and 726 may each include power supplies, such as DC power and digital logic circuitry. The antenna layer 740 includes an antenna 742 and a ground plane layer 744.

The stripline feed and combination layer 730 includes ground plane layers 732 and 736, and a signal plane layer 734. Unlike the antenna structure 600 of FIG. 6, the feed and combination networks are located on a plane separate from that of the PSs, PAs and LNAs. For example, the signal plane layer 734 may include a feed network for transmit operations and a combination network for receive operations. The signal plane 714, in the RFIC layer 710, includes the PAs for signal amplification of signals propagating to the feed network, the LNAs for low-noise filtration of signals propagating to the combination network, and the PSs on each of the transmit and receive paths on the RFIC layer 710. In this respect, the feed network and the combination network in the signal plane 734 are electrically coupled to the PSs, PAs and LNAs in the RFIC layer 710, respectively, through vertical transition vias (not shown).

FIG. 8A illustrates a schematic diagram of a feed distribution layer 800 with an embedded resistor plane, according to various implementations of the subject technology. The feed distribution layer 800 serves as a stripline power divider/power combiner having a multilayered structure with an embedded resistor layer, which provides a wideband response and higher isolation characteristics.

In some aspects, transmission signals are provided from the feed distribution layer 800 of SIWs. The SIW feed distribution may be a planar waveguide structure having a T-junction topology in some implementations, or a Wilkinson-type topology in other implementations. As illustrated in FIG. 8A, the feed distribution layer 800 has a Wilkinson-type topology, where an input transmission line 830 is fed into two output transmission lines 832 and 834, such that an incoming signal propagating on the input transmission line 830 is divided into two output signals that propagate respectively on the output transmission lines 832 and 834 with equivalent phase and amplitude. The Wilkinson-type topology includes a resistor element 810 coupled between the output transmission lines 832 and 834 to provide port isolation and impedance matching between the ports (e.g., the outputs of the output transmission lines 832 and 834). By adding a resistor between the output ports of the power divider, isolation between the ports can be greatly improved. In some implementations, the resistor element 810 is configured to reduce reflection components from a signal propagating between the input transmission line 830 and the two output transmission lines 832 and 834 by matching a characteristic impedance between the input transmission line 830 and the output transmission lines 832 and 834.

In some implementations, the power divider structure is embedded into the SIW as internal layering to form a stripline power divider structure. In this respect, the subject disclosure provides for disposing a resistor layer interposed between the internal layers of the stripline power divider structure. As will be described in FIG. 8B with further detail, the resistor element 810 is disposed as an internal layer that is interposed between stripline layers of the feed distribution layer 800.

Although the feed distribution layer 800 was described in terms of transmitting signals, the feed distribution layer 800 may operate to receive signals. In these cases, the feed distribution layer 800 may include, or operate as, a combination network that combines the received signals. In this respect, the output transmission lines 832, 834 would be referred to as input receive lines, and the input transmission line 830 would be referred to as an output receive line.

the RFIC layer 520 may include LNAs for applying low-noise filtering to the received signals. For example, the antenna layer 530 may include a receive antenna that has a number of radiating elements creating receive paths for signals or reflections from an object at a slightly different time. In various implementations, the radiating elements in the antenna layer 530 are meta-structures or RF antenna patches in an array configuration such as in a 48-element array receive antenna. The radiating elements may be coupled to a combination structure in the feed network layer 510 and to the phase control elements 560, such as phase shifters, and the LNAs. The antenna layer 530 may include more than one receive antenna, such as a 24-element array antenna, to form a 48-element phased array. Other configurations having different numbers of elements may be implemented as well. The receive antennas may have a series of antenna elements that are connected to a series of LNAs and phase shifters, respectively. The combination network may combine the signals from the receive antennas through the phase shifters.

FIG. 8B illustrates a cross-sectional view of a stripline power divider structure 850 that corresponds to a portion of the feed distribution layer 800 of FIG. 8A at the B-B' axis, according to various implementations of the subject technology. The stripline power divider structure 850 includes multiple layers, such as conductive layers 852, 858, and 862, isolation layers 854 and 860, and a resistor layer 856. Not all of the depicted components may he required, however, and one or more implementations may include additional components not shown in the figure. Variations in the arrangement and type of the components may be made without departing from the scope of the claims as set forth herein. Additional components, different components, or fewer components may be provided.

The stripline power divider structure 850 includes the isolation layer 860 disposed on a top surface of the conductive layer 862, and the conductive layer 858 disposed on a top surface of the isolation layer 860. The stripline power divider structure 850 also includes the resistor layer 856 disposed on a top surface of the conductive layer 858, and the isolation layer 854 disposed on a top surface of the resistor layer 856. In some implementations, the resistor layer 856 is configured to reduce reflection components from a signal propagating between an input transmission line (e.g., 830 of FIG. 8A) and output transmission lines (e.g., 832 and 834 of FIG. 8A) by matching a characteristic impedance between the input transmission line and the output transmission lines. The stripline power divider structure 850 further includes the conductive layer 852 disposed on a top surface of the isolation layer 854. The conductive layers 852 and 862 may serve as ground planes, and the conductive layer 858 may serve as the signal plane that includes the transmission lines. The isolation layers 854 and 860 serve to isolate the signal plane from the two ground planes. In some implementations, the stripline power divider structure 850 includes through-hole vias (not shown) that couple the conductive layers 852 and 862 to the conductive layer 858. In some implementations, the through-hole vias may each have a diameter of about 8.0 mm, which may vary without departing from the scope of the present disclosure.

The conductive layers 852, 858, and 862 include a conductive material, such as Copper. The conductive layers 852, 858, and 862 may have individual densities of the conductive material in a range of 50 percent to 90 percent. For example, the conductive layer 852 may include a Copper density of about 80 percent. The conductive layers 858 and 862 may each include densities equivalent to that of the conductive layer 852 in some implementations, or may include different densities than that of the conductive layer 852 (or of each other) in other implementations. Each of the conductive layers 852, 858, and 862 may include a thickness in a range of 0.60 mm to 1.0 mm. The conductive layers 858 and 862 may each have respective thicknesses equivalent to that of the conductive layer 852 in some implementations, or may have different thicknesses than that of the conductive layer 852 (or of each other) in other implementations. For example, the conductive layer 852 may have a thickness of about 1.0 mm, and the conductive layers 858 and 862 may have a same thickness of about 0.7 mm.

The isolation layers 854 and 860 may be formed with different composite materials in some implementations, or formed with same composite materials in other implementations. For example, the isolation layer 854 may comprise a Polytetrafluoroethylene (PTFE) composite material that serves as a high-frequency laminate with a low dielectric loss. In another example, the isolation layer 860 may comprise a pre-impregnated composite material that may include a laminate surface or a Copper foil surface. Each of the isolation layers 854 and 860 may include a thickness in a range of 2.0 mm to 9.0 mm. The isolation layer 854 may have a thicknesses equivalent to that of the isolation layer 860 in some implementations, or may have a different thickness than that of the isolation layer 860 in other implementations. For example, the isolation layer 854 may have a thickness of about 7.0 mm, and the isolation layer 860 may have a thickness of about 8.9 mm.

The resistor layer 856 includes a metallic foil layer having a thickness in a range of 15 micrometers (μm) to 40 μm. The resistor layer 856 may include a resistive material, such as Nickel-Chromium (NiCr), Nickel-Chromium-Aluminum-Silicon (NiCrAlSi), Chromium Silicon Monoxide (CrSiO), or the like. The resistor layer 856 may have a width in a range of 2.5 mm to 20.0 mm. The resistor layer 856 may produce an impedance in a range of 30 ohms to 80 ohms based at least on a corresponding line width of the resistor layer 856. For example, the resistor layer 856 can produce an impedance of 50 ohms with a line width of about 8.4 mm. In another example, the resistor layer 856 may produce an impedance of about 30.8 ohms with a line width of about 19.0 mm. In still another example, the resistor layer 856 may produce an impedance of about 75.6 ohms with a line width of about 3.0 mm.

As illustrated in FIG. 8B, a region 864 depicts the region where the embedded resistor is formed between the two output transmission lines (e.g., 832 and 834 of FIG. 8A) of the feed distribution layer (e.g., 800 of FIG. 8A). Within this region, the conductive layer 858 is etched away to form a trench, which represents the location for the resistor element (e.g., 810 of FIG. 8A). In some implementations, the trench formed is encapsulated with material of the isolation layer 860. The impedance produced at this region is equivalent to about 50 ohms based at least on the width (W) of the resistor element. In some examples, the width of the resistor element is equivalent to about 8.4 mm, which may correspond to the 50-ohm impedance.

In some implementations, the resistor layer 856 is interposed between the conductive layer 858 and the isolation layer 854, such that the resistor layer 856 is disposed on a top surface of the isolation layer 860. In this respect, the trench formed is encapsulated with material of the isolation layer 860.

Figure 9B:
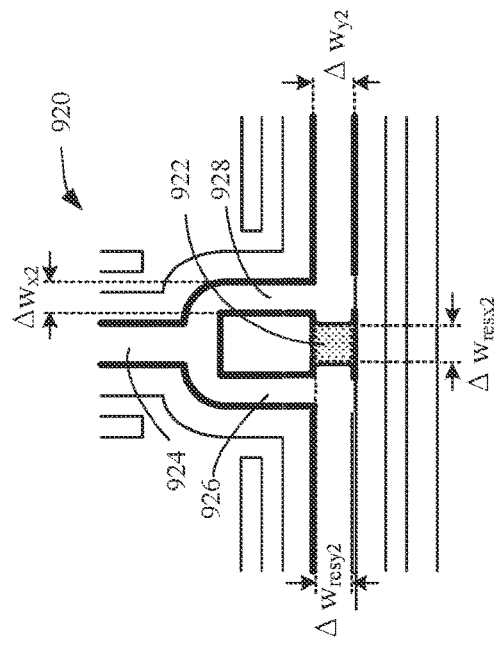
Figure 9D:
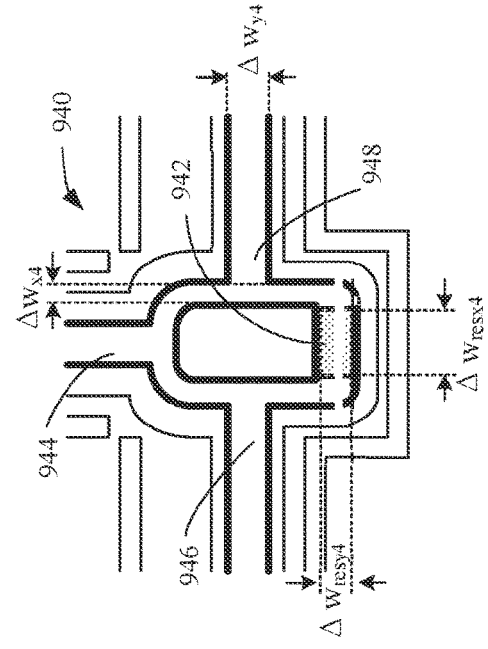
Figure 9A:
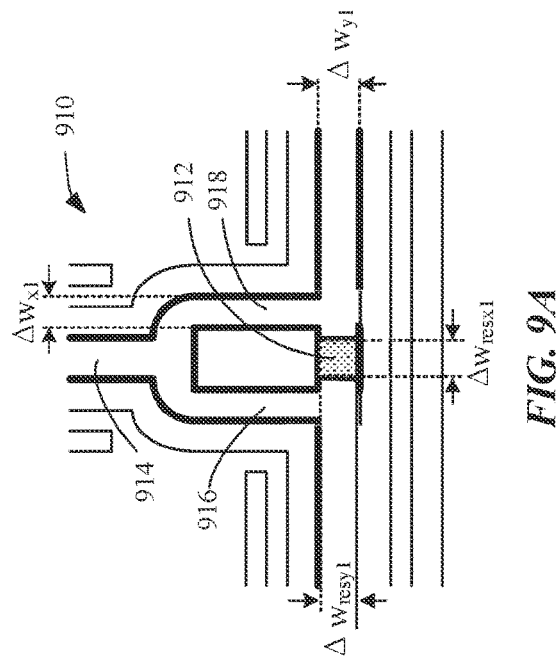

FIGS. 9A-9G illustrate schematic diagrams of different layout configurations of a Wilkinson-type feed distribution layer, according to various implementations of the subject technology. FIG. 9A illustrates a schematic diagram of a first layout configuration 910 of the Wilkinson-type feed distribution layer. The first layout configuration 910 includes an input transmission line 914, and two output transmission lines 916 and 918, which are separated by a predetermined distance. The ends of the two output transmission lines 916 and 918 are coupled to a resistor element 912.

The resistor element 912 is formed as an internal resistor foil layer interposed between internal layers of the Wilkinson-type feed distribution layer. In the first layout configuration 910, the width (depicted as $\Delta w_{resy1}$) and length (depicted as $\Delta w_{resx1}$) of the resistor element 912 are equivalent to produce a matching line impedance of about 50 ohms. For example, the $\Delta w_{resx1}$ is about 8.4 mm, and the $\Delta w_{resy1}$ is about 8.4 mm.

The x-axis linewidth of the output transmission lines 916, 918 is denoted as $\Delta w_{x1}$, and the y-axis linewidth of the output transmission lines 916, 918 is denoted as $\Delta w_{y1}$. In the first layout configuration 910, the x-y linewidths are equivalent to the dimensions of the resistor element 912. For example, the $\Delta w_{x1}$ is about 8.4 mm, and the $\Delta w_{y1}$ is about 8.4 mm. The S-parameters of the feed distribution layer with the first layout configuration 910 may be based at least on the dimensions of the resistor element 912 and the output transmission lines 916 and 918. For example, the S11 may be about −38 decibels (dB) at 73 GHz, and about −20 dB at 77 GHz. The S21 may be about −3 dB at 77 GHz. The S22 and S23 may each be about −22 dB at 77 GHz.

FIG. 9B illustrates a schematic diagram of a second layout configuration 920 of the Wilkinson-type feed distribution layer. The second layout configuration 920 includes an input transmission line 924, and two output transmission lines 926 and 928 that are coupled to a resistor element 922. In the second layout configuration 920, the width (depicted as $\Delta w_{resy2}$) and length of the resistor element 922 (depicted as $\Delta w_{resx2}$) are equivalent to one another to produce a matching line impedance of about 50 ohms. For example, the $\Delta w_{resx2}$ is about 8.4 mm, and the $\Delta w_{resy2}$ is about 8.4 mm.

The x-axis linewidth of the output transmission lines 926, 928 is denoted as $\Delta w_{x2}$, and the y-axis linewidth of the output transmission lines 926, 928 is denoted as $\Delta w_{y2}$. In the second layout configuration 920, the y-axis linewidth is different from the dimensions of the resistor element 922. For example, the $\Delta w_{x2}$ is about 8.4 mm, and the $\Delta w_{y2}$ is about 9.0 mm. The S-parameters of the feed distribution layer with the second layout configuration 920 may be based at least on the dimensions of the resistor element 922 and the output transmission lines 926 and 928. For example, the S11 may be about −25 dB at 78 GHz, and about −24 dB at 77 GHz. The S21 may be about −3 dB at 77 GHz. The S22 may be about −23 dB at 77 GHz, and the S23 may be about −16 dB at 77 GHz.

Figure 9C:
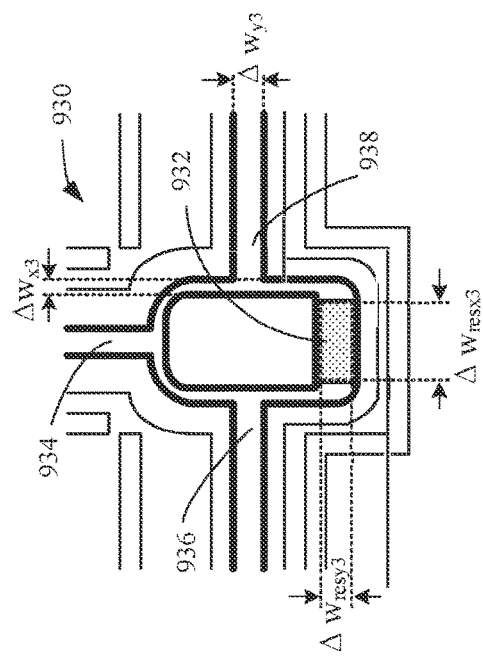

FIG. 9C illustrates a schematic diagram of a third layout configuration 930 of the Wilkinson-type feed distribution layer. The third layout configuration 930 includes an input transmission line 934, and two output transmission lines 936 and 938 that are coupled to a resistor element 932. In the third layout configuration 930, the width (depicted as $\Delta w_{resy3}$) and length of the resistor element 932 (depicted as $\Delta w_{resx3}$) are different from one another to produce a matching line impedance of about 50 ohms. For example, the $\Delta w_{resy3}$ is about 8.4 mm, and the $\Delta w_{resx3}$ is about 14.8 mm.

The x-axis linewidth of the output transmission lines 936, 938 is denoted as $\Delta w_{x3}$, and the y-axis linewidth of the output transmission lines 936, 938 is denoted as $\Delta w_{y3}$. In the third layout configuration 930, the x-axis linewidth is different from the length dimension of the resistor element 932. For example, the $\Delta w_{x3}$ is about 4.0 mm, and the $\Delta w_{y3}$ is about 8.4 mm. The S-parameters of the feed distribution layer with the third layout configuration 930 may be based at least on the dimensions of the resistor element 932 and the output transmission lines 936 and 938. For example, the S11 may be about −32 dB at 77.5 GHz, and about −28 dB at 77 GHz. The S21 may be about −3.3 dB at 77 GHz. The S22 may be about −27 dB at 77 GHz, and the S23 may be about −19 dB at 77 GHz.

FIG. 9D illustrates a schematic diagram of a fourth layout configuration 940 of the Wilkinson-type feed distribution layer. The fourth layout configuration 940 includes an input transmission line 944, and two output transmission lines 946 and 948 that are coupled to a resistor element 942. In the fourth layout configuration 940, the width (depicted as $\Delta w_{resy4}$) and length of the resistor element 942 (depicted as $\Delta w_{resx4}$) are different from one another to produce a matching line impedance of about 44 ohms. For example, the $\Delta w_{resy4}$ is about 10.6 mm, and the $\Delta w_{resx4}$ is about 14.0 mm.

The x-axis linewidth of the output transmission lines 946, 948 is denoted as $\Delta w_{x4}$, and the y-axis linewidth of the output transmission lines 946, 948 is denoted as $\Delta w_{y4}$. In the fourth layout configuration 940, the x-axis linewidth is different from the length dimension of the resistor element 942. For example, the $\Delta w_{x4}$ is about 5.2 mm, and the $\Delta w_{y4}$ is about 10.6 mm. The S-parameters of the feed distribution layer with the fourth layout configuration 940 may be based at least on the dimensions of the resistor element 942 and the output transmission lines 946 and 948. For example, the S11 may be about −32 dB at 74 GHz, and about −29 dB at 77 GHz. The S21 may be about −3.2 dB at 77 GHz. The S22 may be about −26 dB at 77 GHz, and the S23 may be about −18 dB at 77 GHz.

FIG. 9E illustrates a schematic diagram of a fifth layout configuration 950 of the Wilkinson-type feed distribution layer. The fifth layout configuration 950 includes an input transmission line 954, and two output transmission lines 956 and 958 that are coupled to a resistor element 952. In the fifth layout configuration 950, the width (depicted as $\Delta w_{resy5}$) and length of the resistor element 952 (depicted as $\Delta w_{resx5}$) are different from one another. In this configuration, the input transmission line 954 and the output transmission lines 956, 958 have an initial linewidth that is greater than $\Delta w_{y5}$ to produce a matching line impedance of about 44 ohms, and transition to the linewidth equivalent to $\Delta w_{y5}$ to produce a matching line impedance of 50 ohms. For example, the $\Delta w_{resy5}$ is about 10.6 mm, and the $\Delta w_{resx5}$ is about 14.0 mm.

The x-axis linewidth of the output transmission lines 956, 958 is denoted as $\Delta w_{x5}$, and the y-axis linewidth of the output transmission lines 956, 958 is denoted as $\Delta w_{y5}$. In the fifth layout configuration 950, the x-axis linewidth is different from the length dimension of the resistor element 952. For example, the $\Delta w_{x5}$ is about 5.2 mm, and the $\Delta w_{y5}$ is about 10.6 mm. The S-parameters of the feed distribution layer with the fifth layout configuration 950 may be based at least on the dimensions of the resistor element 952 and the output transmission lines 956 and 958. For example, the S11 may be about −50 dB at 81.5 GHz, and about −32 dB at 77 GHz. The S21 may be about −3.2 dB at 77 GHz. The S22 may be about −21 dB at 77 GHz, and the S23 may be about −19 dB at 77 GHz.

FIG. 9F illustrates a schematic diagram of a sixth layout configuration 960 of the Wilkinson-type feed distribution layer. The sixth layout configuration 960 includes an input transmission line 964, and two output transmission lines 966 and 968 that are coupled to a resistor element 962. In the sixth layout configuration 960, the width (depicted as $\Delta w_{resy6}$) and length of the resistor element 962 (depicted as $\Delta w_{resx6}$) are different from one another to produce a matching line impedance of about 35 ohms. For example, the $\Delta w_{resy6}$ is about 15.7 mm, and the $\Delta w_{resx6}$ is about 15.0 mm.

The x-axis linewidth of the output transmission lines 966, 968 is denoted as $\Delta w_{x6}$, and the y-axis linewidth of the output transmission lines 966, 968 is denoted as $\Delta w_{y6}$. In the sixth layout configuration 960, the x-axis linewidth is different from the length dimension of the resistor element 962. For example, the $\Delta w_{x6}$ is about 8.4 mm, and the $\Delta w_{y6}$ is about 15.7 mm. The S-parameters of the feed distribution layer with the sixth layout configuration 960 may be based at least on the dimensions of the resistor element 962 and the output transmission lines 966 and 968. For example, the S11 may be about −26 dB at 70 GHz, and about −21 dB at 77 GHz. The S21 may be about −3.3 dB at 77 GHz. The S22 may be about −28 dB at 77 GHz, and the S23 may be about −15 dB at 77 GHz.

FIG. 9G illustrates a schematic diagram of a seventh layout configuration 970 of the Wilkinson-type feed distribution layer. The seventh layout configuration 970 includes an input transmission line 974, and two output transmission lines 976 and 978 that are coupled to a resistor element 972. In the seventh layout configuration 970, the width (depicted as $\Delta w_{resy7}$) and length of the resistor element 972 (depicted as $\Delta w_{resx7}$) are different from one another. In this configuration, the input transmission line 974 and the output transmission lines 976, 978 have an initial linewidth that is greater than $\Delta w_{y7}$ to produce a matching line impedance of about 35 ohms, and transition to the linewidth equivalent to $\Delta w_{y7}$ to produce a line impedance of 50 ohms. For example, the $\Delta w_{resy7}$ is about 15.7 mm, and the $\Delta w_{resx7}$ is about 15.0 mm.

The x-axis linewidth of the output transmission lines 976, 978 is denoted as $\Delta w_{x7}$, and the y-axis linewidth of the output transmission lines 976, 978 is denoted as $\Delta w_{y7}$. In the seventh layout configuration 970, the x-axis linewidth is different from the dimensions of the resistor element 972. For example, the $\Delta w_{x7}$ is about 5.2 mm, and the $\Delta w_{y7}$ is about 10.6 mm. The S-parameters of the feed distribution layer with the seventh layout configuration 970 may be based at least on the dimensions of the resistor element 972 and the output transmission lines 976 and 978. For example, the S11 may be about −30 dB at 77.5 GHz, and about −29.5 dB at 77 GHz. The S21 may be about −3.2 dB at 77 GHz. The S22 may be about −17 dB at 77 GHz, and the S23 may be about −15 dB at 77 GHz.

Figure 10:
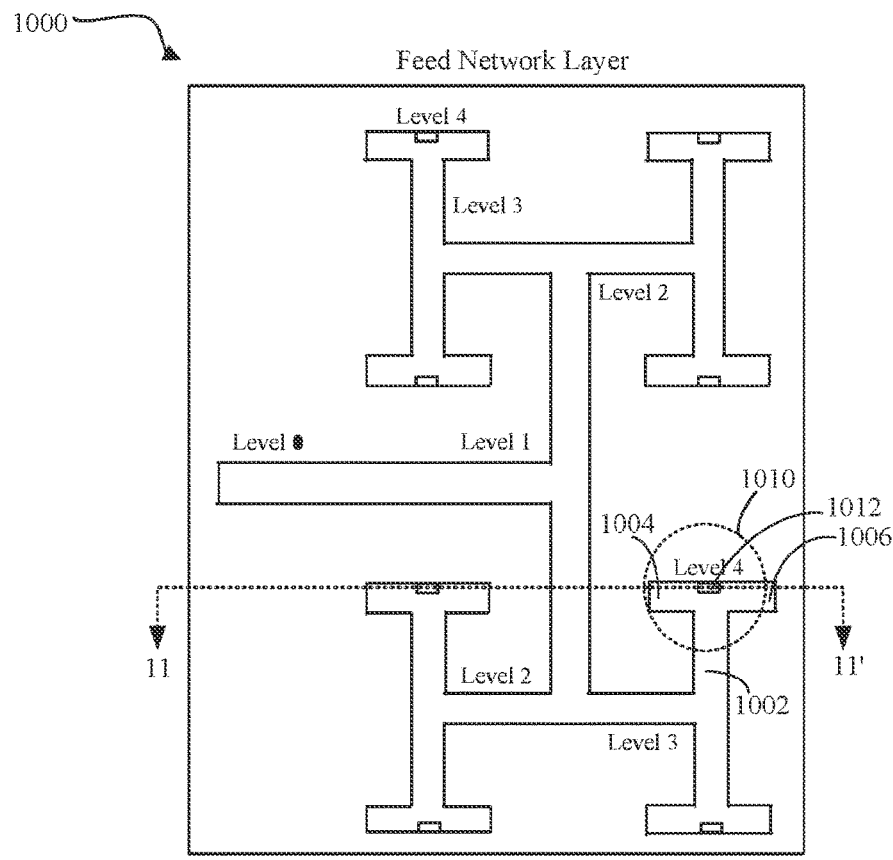
FIG. 10 illustrates a schematic diagram of a T-type feed distribution layer with an embedded resistor plane, according to various implementations of the subject technology.

FIG. 10 illustrates a schematic diagram of a T-type feed distribution layer 1000 with an embedded resistor plane, according to various implementations of the subject technology. As illustrated in FIG. 10, the feed distribution layer 1000 has a T-junction topology, where an input transmission line 1002 is coupled to two output transmission lines 1004 and 1006, such that an incoming signal propagating on the input transmission line 1002 is divided into two output signals that propagate respectively on the output transmission lines 1004 and 1006. Unlike the layout configuration of FIGS. 9A-9G, the layout configuration of the T-type feed distribution layer 1000 has the two output transmission lines 1004 and 1006 extending in opposite directions. The T-type topology includes a resistor element 1012 disposed between the output transmission lines 1004 and 1006 to provide port isolation and impedance matching between the ports (e.g., the outputs of the output transmission lines 1004 and 1006). By adding a resistor between the output ports of the T-type power divider, isolation between the ports can be greatly improved. In some implementations, the resistor element 1012 is configured to reduce reflection components from a signal propagating between the input transmission line 1002 and the two output transmission lines 1004 and 1006 by matching a characteristic impedance between the input transmission line 1002 and the output transmission lines 1004 and 1006. As will be described in FIG. 11 with further detail, the resistor element 1012 is disposed as an internal layer that is interposed between stripline layers of the feed distribution layer 1000.

Figure 11:
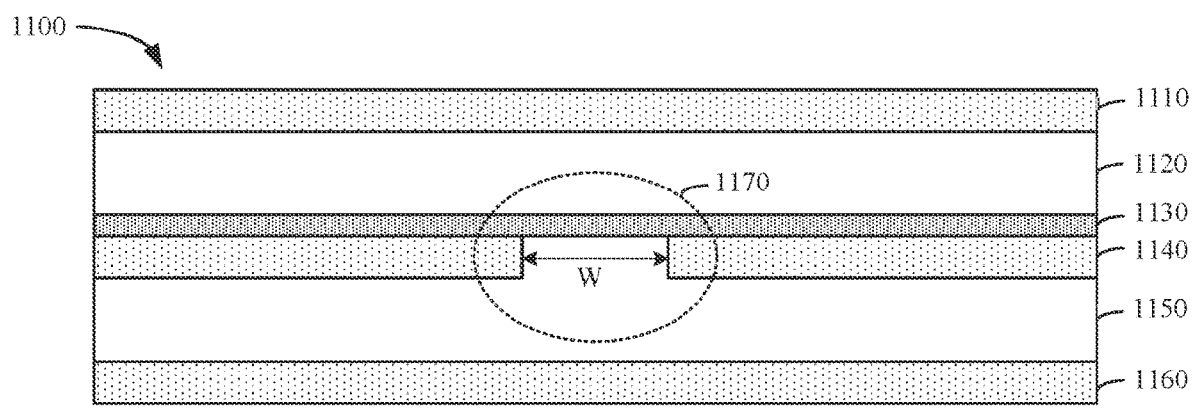
FIG. 11 illustrates a cross-sectional view of a feed distribution layer at the 11-11' axis of FIG. 10, according to various implementations of the subject technology.

FIG. 11 illustrates a cross-sectional view of a stripline power divider structure 1100 that corresponds to a portion of the feed distribution layer 1000 of FIG. 10 at the 11-11' axis, according to various implementations of the subject technology. The stripline power divider structure 1100 includes multiple layers, such as conductive layers 1110, 1140, and 1160, isolation layers 1120 and 1150, and a resistor layer 1130. Not all of the depicted components may he required, however, and one or more implementations may include additional components not shown in the figure. Variations in the arrangement and type of the components may be made without departing from the scope of the claims as set forth herein. Additional components, different components, or fewer components may be provided.

The stripline power divider structure 1100 includes the isolation layer 1150 disposed on a top surface of the conductive layer 1160, and the conductive layer 1140 disposed on a top surface of the isolation layer 1150. The stripline power divider structure 1100 also includes the resistor layer 1130 disposed on a top surface of the conductive layer 1140, and the isolation layer 1120 disposed on a top surface of the resistor layer 1130. In some implementations, the resistor layer 1130 is configured to reduce reflection components from a signal propagating between an input transmission line (e.g., 1002 of FIG. 10) and output transmission lines (e.g., 1004 and 1006 of FIG. 10) by matching a characteristic impedance between the input transmission line and the output transmission lines. The stripline power divider structure 1100 further includes the conductive layer 1110 disposed on a top surface of the isolation layer 1120. The conductive layers 1110 and 1160 may serve as ground planes, and the conductive layer 1140 may serve as the signal plane that includes the transmission lines. The isolation layers 1120 and 1150 serve to isolate the signal plane from the two ground planes. In some implementations, the stripline power divider structure 1100 includes through-hole vias (not shown) that couple the conductive layers 1110 and 1160 to the conductive layer 1140. In some implementations, the through-hole vias may each have a diameter of about 8.0 mm, which may vary without departing from the scope of the present disclosure. In some implementations, the thicknesses of the layers of the stripline power divider structure 1100 may correspond to those of the stripline power divider structure 1000 of FIG. 10, but may vary without departing from the scope of the present disclosure.

As illustrated in FIG. 11, a region 1170 depicts the region where the embedded resistor is formed at a junction between the two output transmission lines (e.g., 1104 and 1106 of FIG. 10) of the feed distribution layer 1100. Within this region, the conductive layer 1140 is etched away to form a trench, which represents the location for the resistor element (e.g., 1012 of FIG. 10). In some implementations, the trench formed is encapsulated with material of the isolation layer 1150. The impedance produced at this region is equivalent to about 50 ohms based at least on the width (W) of the resistor element. In some examples, the width of the resistor element is equivalent to about 8.4 mm, which may correspond to the 50-ohm impedance.

Figure 12:
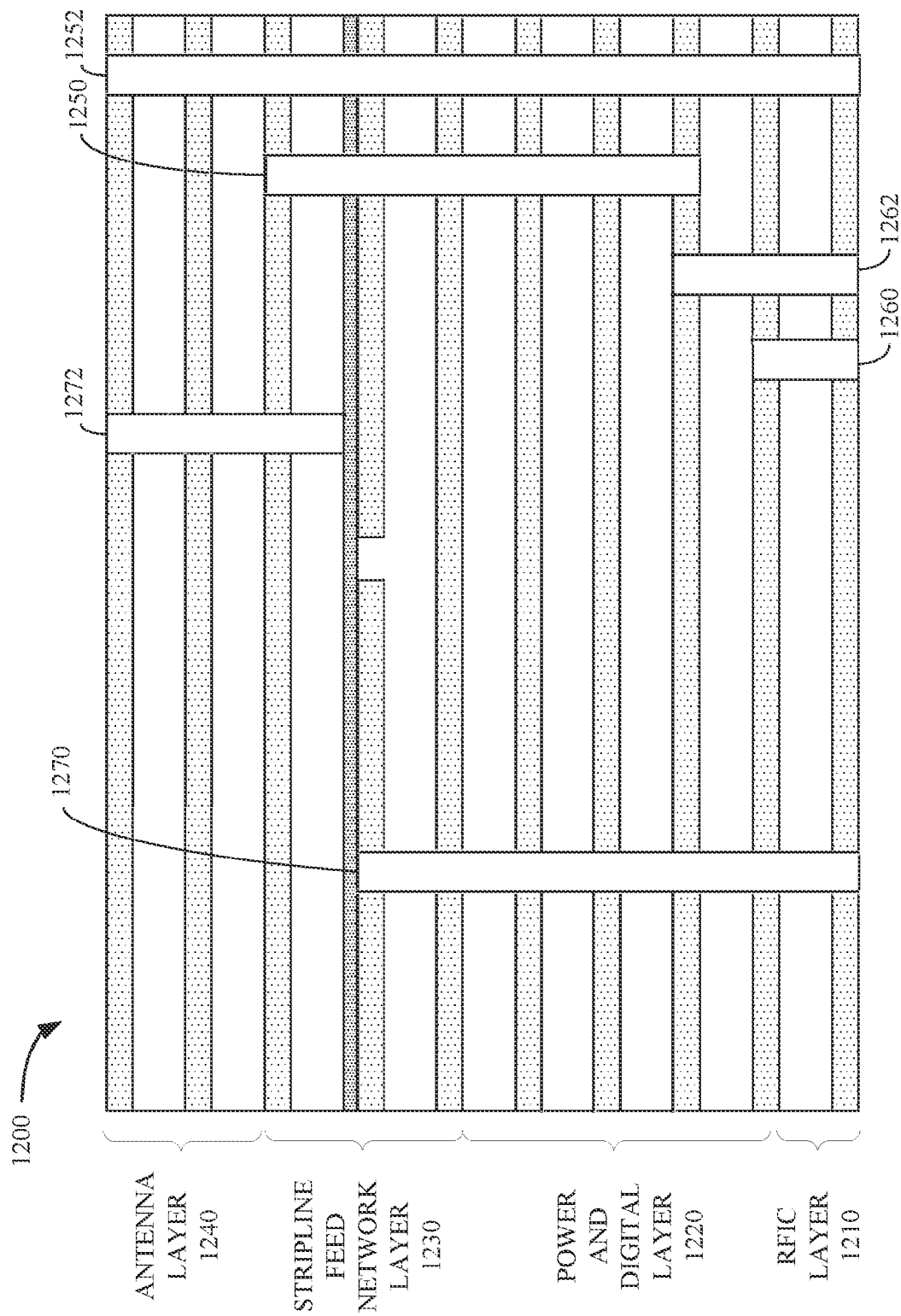
FIG. 12 illustrates a cross-sectional view of a stack-up configuration of an antenna structure with vertical transition vias, according to various implementations of the subject technology.

FIG. 12 illustrates a cross-sectional view of a stack-up configuration of an antenna structure 1200 with vertical transition vias, according to various implementations of the subject technology. The antenna structure 1200 includes multiple layers, such as an RFIC layer 1210, a power and digital layer 1220, a stripline feed network layer 1230, and an antenna layer 1240. The antenna structure 1200 also includes a first set of through-hole vias 1250 and 1252, and a second set of through-hole vias 1260 and 1262. The stripline feed network layer 1230 is, or includes at least a portion of, the layers of the stripline power divider structure 1100 of FIG. 11. Not all of the depicted components may he required, however, and one or more implementations may include additional components not shown in the figure. Variations in the arrangement and type of the components may be made without departing from the scope of the claims as set forth herein. Additional components, different components, or fewer components may be provided.

The antenna structure 1200 includes the first set of through-hole vias 1250 and 1252 and the second set of through-hole vias 1260 and 1262 to reach internal layers within the antenna structure 1200. The antenna structure 1200 includes a stack-up configuration of the layers with proper layer ordering, layer thickness, and layer placement of the stripline structure (e.g., the stripline feed network layer 1230) within the internal layers of the antenna structure 1200 to reduce (or minimize) any stub effects that cause an unwanted shorting of a desired frequency band. In some aspects, the first through-hole vias 1250 and 1252 and the second through-hole vias 1260 and 1262 allow for the antenna structure 1200 to provide a wideband response, while having shifted the stop band frequency to lower frequencies.

As illustrated in FIG. 12, the through-hole via 1252 penetrates through all of the layers of the antenna structure 1200 such that a conductive layer in the antenna layer 1240 can be electrically coupled to a conductive layer in the RFIC layer 1210 via the through-hole via 1252. The through-hole via 1250 penetrates through a subset of the layers of the antenna structure 1200, namely through conductive and isolation layers in the stripline feed network layer 1230 and in the power and digital layer 1220, such that one or more conductive layers of the stripline feed network layer 1230 can be electrically coupled to a conductive layer(s) in the power and digital layer 1220 via the through-hole via 1250. In this respect, the through-hole via 1252 may have a length that is greater than that of the through-hole via 1250.

The second through-hole vias 1260 and 1262 penetrate through different a different subset of the layers in the antenna structure 1200, namely through conductive and isolation layers in the power and digital layer 1220 and in the RFIC layer 1210. In this respect, the through-hole via 1262 may have a length that is greater than that of the through-hole via 1260. In some implementations, the through-hole vias 1260 and 1262 are fabricated using a laser-etch operation or a laser drilling operation.

In some implementations, the antenna structure 1200 includes a third set of through-hole vias 1270 and 1272 to reach other internal layers within the antenna structure 1200, such as the stripline feed network layer 1230. For example, the via 1270 may extend vertically between a portion of the stripline feed network layer 1230 and the RFIC layer 1210. The via 1272 may extend vertically between the antenna layer 1240 and a portion of the stripline feed network layer 1230.

Figure 13:
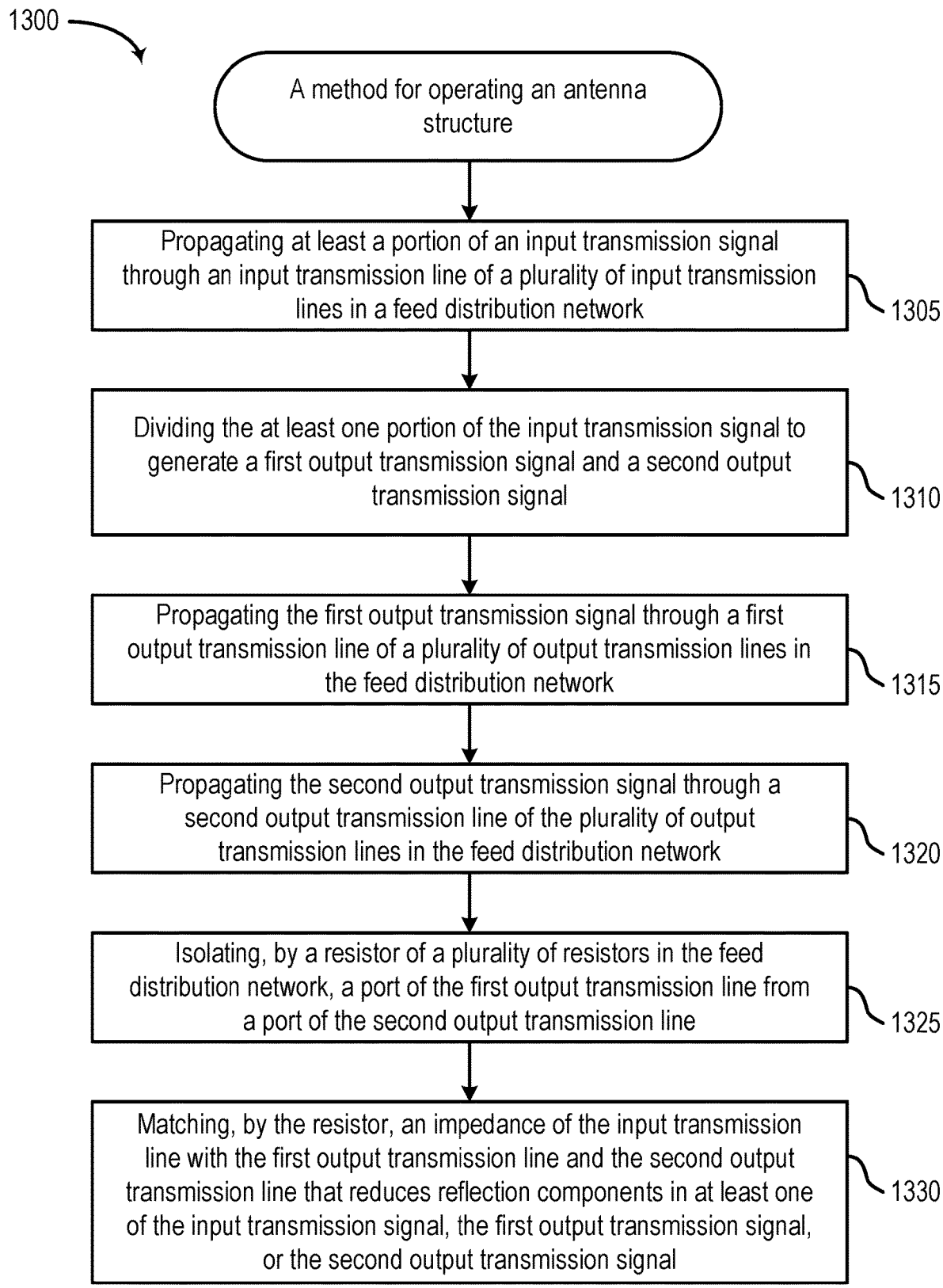
FIG. 13 shows a method 1300 for operating an antenna structure.

FIG. 13 shows a method 1300 for operating an antenna structure.

Method 1300 begins at block 1305 with propagating at least a portion of an input transmission signal through an input transmission line of a plurality of input transmission lines in a feed distribution network.

Method 1300 then proceeds to block 1310 with dividing the at least one portion of the input transmission signal to generate a first output transmission signal and a second output transmission signal.

Method 1300 then proceeds to block 1315 with propagating the first output transmission signal through a first output transmission line of a plurality of output transmission lines in the feed distribution network.

Method 1300 then proceeds to block 1320 with propagating the second output transmission signal through a second output transmission line of the plurality of output transmission lines in the feed distribution network.

Method 1300 then proceeds to block 1325 with isolating, by a resistor of a plurality of resistors in the feed distribution network, a port of the first output transmission line from a port of the second output transmission line.

Method 1300 then proceeds to block 1330 with matching, by the resistor, an impedance of the input transmission line with the first output transmission line and the second output transmission line that reduces reflection components in at least one of the input transmission signal, the first output transmission signal, or the second output transmission signal.

Figure 14:
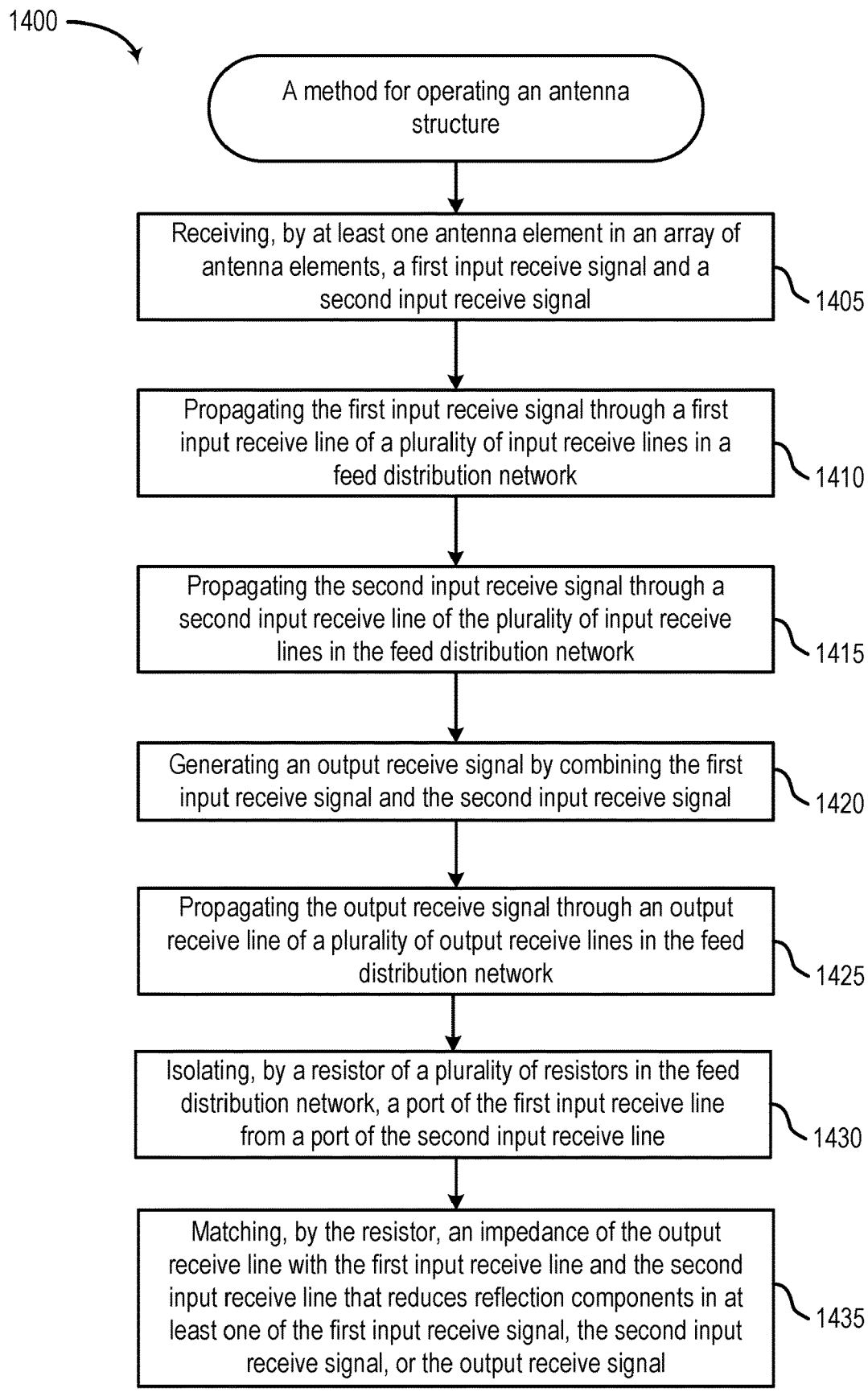
FIG. 14 shows a method 1400 for operating an antenna structure.

FIG. 14 shows a method 1400 for operating an antenna structure.

Method 1400 begins at block 1405 with receiving, by at least one antenna element in an array of antenna elements, a first input receive signal and a second input receive signal.

Method 1400 then proceeds to block 1410 with propagating the first input receive signal through a first input receive line of a plurality of input receive lines in a feed distribution network.

Method 1400 then proceeds to block 1415 with propagating the second input receive signal through a second input receive line of the plurality of input receive lines in the feed distribution network.

Method 1400 then proceeds to block 1420 with generating an output receive signal by combining the first input receive signal and the second input receive signal.

Method 1400 then proceeds to block 1425 with propagating the output receive signal through an output receive line of a plurality of output receive lines in the feed distribution network.

Method 1400 then proceeds to block 1430 with isolating, by a resistor of a plurality of resistors in the feed distribution network, a port of the first input receive line from a port of the second input receive line.

Method 1400 then proceeds to block 1435 with matching, by the resistor, an impedance of the output receive line with the first input receive line and the second input receive line that reduces reflection components in at least one of the first input receive signal, the second input receive signal, or the output receive signal.

It is also appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein, but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e. each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A; only B; or only C; any combination of A, B, and C; and/or at least one of each of A, B, and C.

Furthermore, to the extent that the term "include", "have", or the like is used in the description or the claims, such term is intended to be inclusive in a manner similar to the term "comprise", as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference, and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A feed distribution network, comprising:
   a plurality of ground planes;
   a signal plane, coupled to the plurality of ground planes, configured to serve as a feed to an antenna array, wherein the signal plane comprises an input transmission line and a plurality of output transmission lines coupled to the input transmission line;
   a resistor plane interposed between the signal plane and at least one ground plane of the plurality of ground planes, the resistor plane configured to match a characteristic impedance between the input transmission line and the plurality of output transmission lines; and
   a plurality of isolation layers coupled to the signal plane and to the plurality of ground planes, wherein the resistor plane is interposed between a first isolation layer of the plurality of isolation layers and the signal plane.

2. The feed distribution network of claim 1, further comprising:
   a plurality of through-hole vias penetrating through a plurality of layers in the feed distribution network including the plurality of ground planes and the signal plane.

3. The feed distribution network of claim 2, wherein the signal plane is interposed between a first ground plane of the plurality of ground planes and a second ground plane of the plurality of ground planes, wherein the signal plane is electrically coupled to the first ground plane and the second ground plane through at least one through-hole via of the plurality of through-hole vias.

4. The feed distribution network of claim 1, wherein the feed distribution network has a T-junction topology.

5. The feed distribution network of claim 1, wherein the feed distribution network has a Wilkinson-type topology.

6. The feed distribution network of claim 1, wherein the antenna array is tuned to at least one of transmit or receive signals in the millimeter-wave frequency range.

7. The feed distribution network of claim 1, wherein the input transmission line and the plurality of output transmission lines operate together as a power divider to divide signals.

8. The feed distribution network of claim 1, wherein the input transmission line and the plurality of output transmission lines operate together as a combiner to combine signals.

9. A method for operating an antenna structure, comprising:
   propagating at least a portion of an input transmission signal through an input transmission line of a plurality of input transmission lines in a feed distribution network;
   dividing the at least one portion of the input transmission signal to generate a first output transmission signal and a second output transmission signal;
   propagating the first output transmission signal through a first output transmission line of a plurality of output transmission lines in the feed distribution network;
   propagating the second output transmission signal through a second output transmission line of the plurality of output transmission lines in the feed distribution network;
   isolating, by a resistor of a plurality of resistors in the feed distribution network, a port of the first output transmission line from a port of the second output transmission line; and
   matching, by the resistor, an impedance of the input transmission line with the first output transmission line and the second output transmission line that reduces reflection components in at least one of the input transmission signal, the first output transmission signal, or the second output transmission signal,
   wherein the resistor is coupled between the first output transmission line and the second output transmission line.

10. The method of claim 9, further comprising generating the input transmission signal.

11. The method of claim 9, further comprising amplifying the input transmission signal.

12. The method of claim 9, further comprising shifting a phase of the first output transmission signal to at least one of steer or adjust a beamwidth of at least one radiated transmit antenna beam.

13. The method of claim 9, further comprising shifting a phase of the second output transmission signal to at least one of steer or adjust a beamwidth of at least one radiated transmit antenna beam.

14. The method of claim 9, further comprising radiating, by at least one antenna element in an array of antenna elements, the first output transmission signal and the second output transmission signal to generate at least one transmit antenna beam.

15. A method for operating an antenna structure, comprising:
   receiving, by at least one antenna element in an array of antenna elements, a first input receive signal and a second input receive signal;

propagating the first input receive signal through a first input receive line of a plurality of input receive lines in a feed distribution network;

propagating the second input receive signal through a second input receive line of the plurality of input receive lines in the feed distribution network;

generating an output receive signal by combining the first input receive signal and the second input receive signal;

propagating the output receive signal through an output receive line of a plurality of output receive lines in the feed distribution network;

isolating, by a resistor of a plurality of resistors in the feed distribution network, a port of the first input receive line from a port of the second input receive line; and matching, by the resistor, an impedance of the output receive line with the first input receive line and the second input receive line that reduces reflection components in at least one of the first input receive signal, the second input receive signal, or the output receive signal, wherein the resistor is coupled between the first input receive line and the second input receive line.

16. The method of claim 15, further comprising amplifying at least a portion of the output receive signal.

17. The method of claim 15, further comprising shifting a phase of the first input receive signal to at least one of steer or adjust a beamwidth of at least one receive antenna beam.

18. The method of claim 15, further comprising shifting a phase of the second input receive signal to at least one of steer or adjust a beamwidth of at least one receive antenna beam.

19. The method of claim 15, further comprising receiving, by the at least one antenna element in the array of antenna elements, at least one receive antenna beam comprising the first input receive signal and the second input receive signal.

* * * * *